(12) United States Patent
Spackman

(10) Patent No.: US 12,064,669 B2
(45) Date of Patent: *Aug. 20, 2024

(54) GOLF CLUB HEAD WITH TEXTURED FACEPLATE AND METHODS OF MANUFACTURING THE SAME

(71) Applicant: KARSTEN MANUFACTURING CORPORATION, Phoenix, AZ (US)

(72) Inventor: Clayson C. Spackman, Scottsdale, AZ (US)

(73) Assignee: Karsten Manufacturing Corporation, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/932,830

(22) Filed: Sep. 16, 2022

(65) Prior Publication Data

US 2023/0023334 A1 Jan. 26, 2023

Related U.S. Application Data

(63) Continuation of application No. 17/121,581, filed on Dec. 14, 2020, now Pat. No. 11,478,682.

(60) Provisional application No. 63/198,112, filed on Sep. 29, 2020, provisional application No. 62/976,987, filed on Feb. 14, 2020, provisional application No. 62/948,083, filed on Dec. 13, 2019.

(51) Int. Cl.
*A63B 53/04* (2015.01)
*B23K 26/356* (2014.01)

(52) U.S. Cl.
CPC ........ *A63B 53/0445* (2020.08); *A63B 53/047* (2013.01); *B23K 26/356* (2015.10); *A63B 53/0466* (2013.01); *A63B 2053/0479* (2013.01)

(58) Field of Classification Search
CPC .................................................. A63B 53/0445
USPC ................................................... 473/324–350
See application file for complete search history.

(56) References Cited

U.S. PATENT DOCUMENTS

| 732,136 | A | * | 6/1903 | Taylor | ................ | A63B 53/0466 473/331 |
| 873,423 | A | * | 12/1907 | Govan | .................... | A63B 60/00 473/330 |
| 1,526,951 | A | * | 2/1925 | Berry | ................. | A63B 53/0487 144/24.24 |
| 1,535,670 | A | * | 4/1925 | Kidd | .................. | A63B 53/0466 473/331 |

(Continued)

FOREIGN PATENT DOCUMENTS

| CN | 102581109 | 7/2012 |
| CN | 105328352 | 2/2016 |

(Continued)

*Primary Examiner* — Alvin A Hunter

(57) ABSTRACT

Embodiments of a golf club head with a textured strikeface and methods to form said club head through laser shock treatment are generally described herein. The golf club head can comprise a body and a strikeface. The strikeface has a textured front surface, with an array of indentions. Each indention can have a footprint area of between 0.01 μm² (1×10⁻⁸ mm²) to 250,000 μm² (0.25 mm²). The textured front surface can affect the spin imparted to a golf ball upon impact. Other embodiments may be described and claimed.

20 Claims, 11 Drawing Sheets

(56) References Cited

U.S. PATENT DOCUMENTS

| | | | | |
|---|---|---|---|---|
| 1,840,451 | A * | 1/1932 | Jansky | A63B 53/0466 |
| | | | | 473/330 |
| 3,637,218 | A * | 1/1972 | Carlino | A63B 53/02 |
| | | | | 473/330 |
| 4,529,203 | A * | 7/1985 | Ribaudo | A63B 60/00 |
| | | | | 473/331 |
| 4,754,970 | A * | 7/1988 | Kobayashi | A63B 53/04 |
| | | | | 473/290 |
| 4,902,016 | A * | 2/1990 | Boone | A63B 53/04 |
| | | | | 473/330 |
| 4,964,641 | A * | 10/1990 | Miesch | A63B 53/0487 |
| | | | | 473/331 |
| 6,089,993 | A * | 7/2000 | Woodward | A63B 53/0487 |
| | | | | 473/331 |
| 6,257,994 | B1 * | 7/2001 | Antonious | A63B 53/0487 |
| | | | | 473/331 |
| 6,398,665 | B1 * | 6/2002 | Antonious | A63B 53/04 |
| | | | | 473/331 |
| 6,623,376 | B2 | 9/2003 | Poynor | |
| 6,994,635 | B2 * | 2/2006 | Poynor | A63B 53/0466 |
| | | | | 148/516 |
| 7,278,928 | B2 * | 10/2007 | Newman | A63B 53/047 |
| | | | | 473/342 |
| 8,499,599 | B2 | 8/2013 | Cheng et al. | |
| 8,608,590 | B2 | 12/2013 | Hackel et al. | |
| 8,696,492 | B1 * | 4/2014 | Hocknell | A63B 53/047 |
| | | | | 473/340 |
| 9,498,685 | B2 * | 11/2016 | Abbott | A63B 53/04 |
| 9,566,484 | B1 * | 2/2017 | Abbott | A63B 53/007 |
| 9,849,351 | B2 * | 12/2017 | Serrano | A63B 53/04 |
| 9,943,735 | B2 * | 4/2018 | Rife | A63B 53/0487 |
| 9,987,530 | B2 * | 6/2018 | Jertson | A63B 53/065 |
| 10,052,529 | B1 * | 8/2018 | Abbott | A63B 53/0487 |
| 10,722,768 | B1 * | 7/2020 | Yi | A63B 53/0425 |
| 11,478,682 | B2 * | 10/2022 | Spackman | A63B 53/0408 |
| 2005/0113186 | A1 * | 5/2005 | Newman | A63B 53/047 |
| | | | | 473/342 |
| 2009/0011852 | A1 * | 1/2009 | Solheim | A63B 53/047 |
| | | | | 473/331 |
| 2009/0093320 | A1 * | 4/2009 | Yoo | A63B 60/00 |
| | | | | 473/330 |
| 2010/0311519 | A1 * | 12/2010 | Treadwell | A63B 53/04 |
| | | | | 473/331 |
| 2011/0269567 | A1 * | 11/2011 | Ban | A63B 53/04 |
| | | | | 473/331 |
| 2012/0135819 | A1 * | 5/2012 | Uetz | A63B 53/047 |
| | | | | 473/331 |
| 2014/0274452 | A1 * | 9/2014 | Oldknow | A63B 60/00 |
| | | | | 473/331 |
| 2016/0016050 | A1 * | 1/2016 | Rife | A63B 53/0487 |
| | | | | 473/331 |
| 2017/0050265 | A1 | 2/2017 | Lu et al. | |
| 2017/0239534 | A1 * | 8/2017 | Rife | A63B 53/0487 |
| 2018/0036606 | A1 * | 2/2018 | Sclafani | A63B 53/047 |
| 2019/0388741 | A1 * | 12/2019 | Ban | A63B 53/04 |
| 2020/0038717 | A1 * | 2/2020 | Stubben | A63B 53/0487 |

FOREIGN PATENT DOCUMENTS

| | | | |
|---|---|---|---|
| CN | 107217133 | 9/2017 | |
| JP | 2007169754 | 7/2007 | |
| TW | 448064 | 8/2001 | |
| TW | 448064 B | * 8/2001 | |
| WO | WO-2007146398 A2 | * 12/2007 | A63B 53/04 |

* cited by examiner

GOLF CLUB HEAD WITH TEXTURED FACEPLATE AND METHODS OF MANUFACTURING THE SAME

CROSS-REFERENCES

This is a continuation of U.S. patent application Ser. No. 17/121,581, filed on Dec. 14, 2020, which claims priority to U.S. Provisional Patent Appl. No. 62/948,083, filed on Dec. 13, 2019, U.S. Provisional Patent Appl. No. 62/976,987, filed on Feb. 14, 2020, and U.S. Provisional Patent Appl. No. 63/198,112, filed on Sep. 29, 2020, wherein the contents of all above-described disclosures are incorporated herein by reference in their entirety.

FIELD

The present disclosure relates generally to golf equipment, and more particularly, to golf club heads with textured strikefaces. The surface texture or coefficient of friction of a strikeface can affect the characteristic time of the golf club head and the spin imparted to a golf ball upon impact. Certain surface textures can also increase the fatigue and wear resistance of the golf club head.

BACKGROUND

Laser shock peening (LSP) is a process that creates an array of laser shock impact zones. In the golf industry, this technology has been used only to treat a strikeface to increase the hardness of the striking face. Laser shock peening a strikeface creates forged indentions (or wells) in a front surface of the strikeface. During the laser shock treatment, a laser is shown through a confinement layer and into an absorptive layer, which lies on top of the strikeface that is being treated. The energy from the laser beam is absorbed by the absorptive layer, causing this layer to quickly turn into plasma. The quick production of plasma causes a shockwave that deforms the strikeface front surface like a hammer, creating indentions in the surface. The intensity of the laser affects the amount of plasma that is produced. In turn, the amount of plasma affects the strength of the shockwave, which corresponds to the indention depth (or well depth).

Laser shock peening (LSP) has been used to introduce residual compressive stress into certain portions of the strikeface, creating a stress gradient between the treated and untreated portions of the strikeface. Each laser pulse treats an area of greater than 4 $mm^2$, which corresponds to the size of the laser beam. The art has only achieved treating strikeface regions sized 4 $mm^2$ or greater, which fails to sufficiently alter the coefficient of friction between the strikeface and a golf ball. There is a need in the art for a strikeface having a fine texture, (with indentions (or wells) that are smaller than 4 $mm^2$) which exhibit a coefficient of friction that provides desired launch and spin rate characteristics at impact with a golf ball. There is also a need in the art for strikefaces with improved durability and resistance to fatigue and crack propagation.

Figure 1:
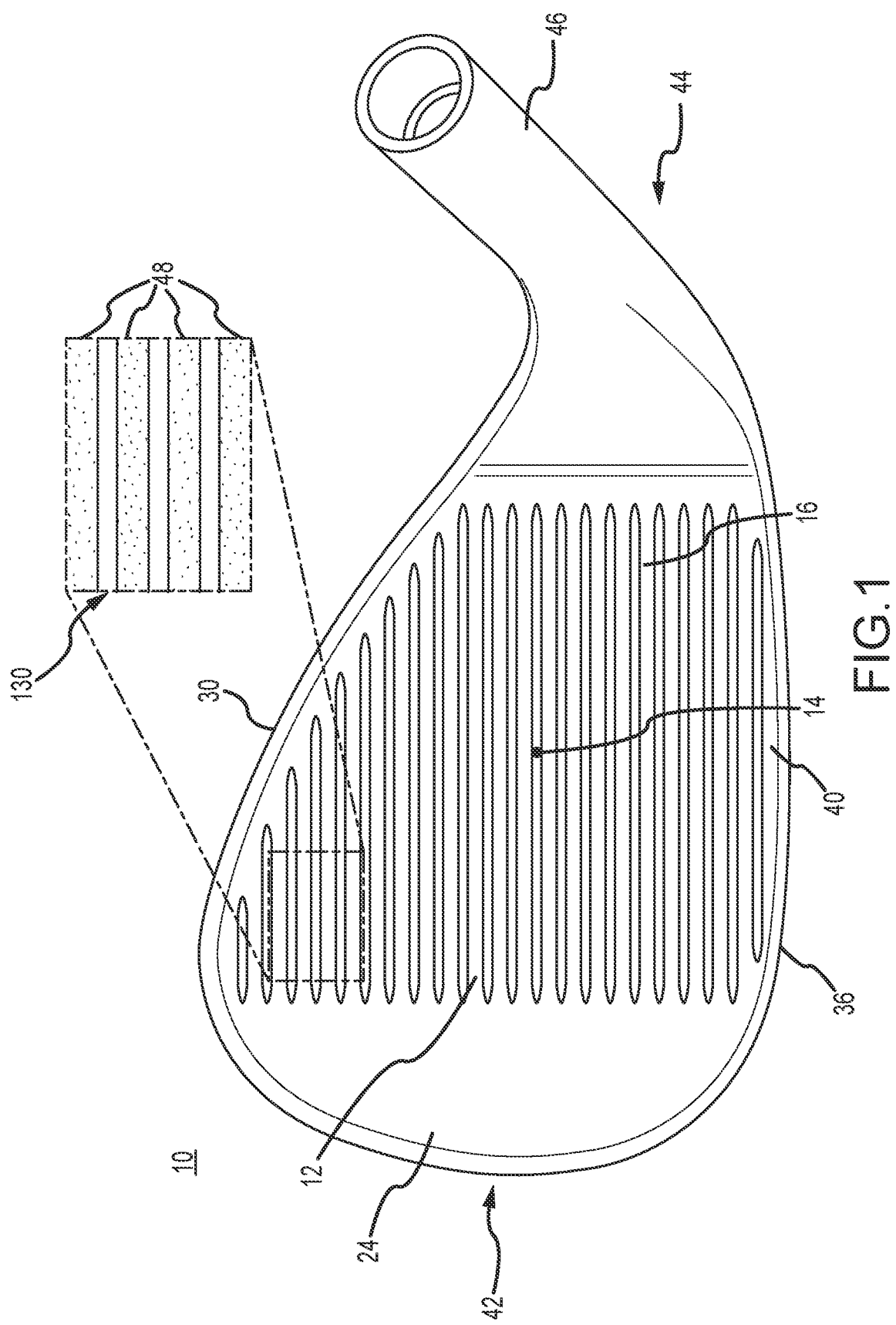
FIG. 1 shows a face-normal view of a wedge-type golf club head having a textured strikeface, including a closeup illustration of the location of the texture, interspersed between grooves, according to an embodiment.

All printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

The invention described herein is a golf club head having a textured surface with a plurality of indentions. The textured surface can be a strikeface front surface, a strikeface rear surface, or a body surface, such as a sole surface. In some embodiments, multiple surfaces are textured. The strikeface front surface, strikeface rear surface, and/or the sole surface can be textured through a laser shock surface patterning (LSSP), treating, or texturing process that resembles but distinctly differs from a laser shock peening (LSP) process. The instant LSSP process is different from the existing LSP process because the LSSP process results in a higher coefficient of friction between a treated surface and a golf ball. The instant laser shock surface patterning process creates forged indentions that are significantly smaller (i.e. having a footprint area of 0.01 $\mu m^2$ ($1 \times 10^{-8}$ $mm^2$) to 250,000 $\mu m^2$ (0.25 $mm^2$)), than the prior art indentions (i.e. having a footprint area of 4,000,000 $\mu m^2$ (4 $mm^2$) or greater), which are created with a previous LSP process. The herein described laser shock surface patterning (LSSP) process also creates well-defined boundaries to the forged indentations (or wells). The textured surface, described herein, can comprise a higher coefficient of friction than a surface lacking a LSSP texture. For embodiments with a textured strikeface front surface, the plurality of indentations can improve shot performance, especially under wet conditions. In particular, texturing the strikeface using a LSSP process can lower launch angle, increase ball spin, and maintain ball speed.

The indentions created using LSSP have well-defined boundaries that control the resulting coefficient of friction between a strikeface and a golf ball. For low-lofted club heads, the spin rate and ball flight trajectory, such as launch angle, of an impacted golf ball can be improved by an increased coefficient of friction, especially under wet conditions. Treating at least one surface of the strikeface using LSSP can create a finer grain structure and introduce compressive residual stress, improving fatigue resistance, durability, and energy storage mechanics. The herein described LSSP process can also be used to relieve stress within weld zones and can create more aerodynamic surfaces.

Definitions

The golf club head described herein can have a loft angle, measured as the angle between the ground plane and a plane tangent to a centerpoint of the strikeface. In general, driver-type club heads comprise lower loft angles than iron or wedge-type club heads.

"Low-lofted" as used herein, can refer to a golf club head having a loft angle of less than 18 degrees. "High-lofted" as used herein, can refer to a golf club head having a loft angle of 18 degrees or greater. However, for some designs the cutoff value of 18 degrees can shift by up to plus or minus 4 degrees, based on the desired performance goals of particular golf club heads.

"Laser shock peening," abbreviated "LSP," as used herein, is a process of treating a surface by forging indentions that are equal to the spot size of a laser beam used during the process. The laser beam spot size (and a resulting indention footprint size) is equal to or greater than 4 mm$^2$ or equal to or greater than 5 mm$^2$. A LSP process can comprise placing an absorptive layer on top of the surface being treated, placing a confinement layer on top of the absorptive layer, shining a laser through the confinement layer to cause the absorptive layer to turn into plasma. The creation of plasma causes a shockwave that deforms or forges the surface underneath the absorptive layer, creating indentions that match the spot size of the laser beam.

"Laser shock surface patterning," abbreviated "LSSP," as used herein, is a process of treating a surface, to give it texture, by forging at least one plurality of indentions (multiple indentions) that each have a footprint area between 0.01 μm$^2$ (1×10$^{-8}$ mm$^2$) to 250,000 μm$^2$ (0.25 mm$^2$). In other words, each indention has a footprint area that is significantly smaller than a spot size of a laser beam used during the LSSP process. The LSSP process uses a mask layer (also called a mesh) to block the laser beam from affecting certain regions of the surface being treated. In this way, the mask layer enables the creation of many miniature indentions with each single laser shock. A LSSP process can comprise placing a mask layer (mesh) on top of the surface being treated, placing an absorptive layer on top of the mask layer, placing a confinement layer on top of the absorptive layer, shining a laser through the confinement layer to cause the absorptive layer to turn into plasma. The creation of plasma causes a shockwave that move through apertures of the mask layer to deform or forge the surface underneath the apertures, creating indentions that match the aperture size of the mask layer. The parts of the surface covered by the material of the mask (mesh) are protected from the shockwave and therefore remain unforged.

"Golf ball" as used herein, refers to a urethane covered golf ball. The coefficients of friction described below were measured between a metallic strikeface and a urethane covered golf ball.

"Treated surface" as used herein, can be understood to include a treated surface layer and adjacent material layers that are affected during surface treatment. In other words, "treated surface" can refer to any material that exhibits an altered grain structure after the LSSP process. When used in the context of a coefficient of friction discussion, "treated surface" can refer to only the exposed surface layer. In these instances, the "treated surface" can have a measurable coefficient of friction with respect to an outside object, such as a golf ball.

"Launch angle" as used herein, refers to an angle between the ground plane and an average trajectory of a golf ball, at or shortly after an impact between the golf ball and a golf club head.

"Dry conditions" as used herein, can refer to a state where the strikeface does not have visible moisture on its front surface. "Dry conditions" can also refer to weather conditions devoid of rain, dew, condensation, or other forms of moisture that would interfere with the contact between a golf ball and the strikeface of a golf club head.

"Wet conditions" as used herein, can refer to a state where the strikeface has visible moisture on its front surface. "Wet conditions" as used herein, can also refer to weather conditions including rain, dew, condensation, or other forms of moisture that would interfere with the contact between a golf ball and the strikeface of a golf club head. Taking a shot from tall grass is also considered a wet condition.

"Flat" or "level" surfaces, as used herein, can refer to surfaces having an Ra value that is at or below approximately 1 μm (1000 nm). In some embodiments, "flat" or "level" surfaces can have Ra values of less than 0.02 μm (20 nm).

DETAILED DESCRIPTION

The herein described textured strikeface surfaces and/or the textured body surfaces comprise an array of forged indentions. The forged indentions (or wells) each have a surface footprint area and a maximum depth. The footprint area of each indention ranges between 0.01 μm$^2$ to 250,000 μm$^2$. The depth of each forged indention ranges between 0.1 μm to 15 μm. In addition to altering the surface texture, the laser shock surface patterning (LSSP) process compresses the material grain structure of the treated surface. Indention texturing controls the coefficient of friction of the treated surface, with respect to a golf ball surface. When the strikeface is the treated surface, the coefficient of friction increases, which can improve shot performance by lowering launch angle, increasing ball spin, and maintaining ball speed. Indention texturing can also control the residual stresses (related to the compressed/forged configuration of the material) and the aerodynamic properties of the treated surface. Additional benefits of indention texturing can include, but are not limited to, a slowing of crack propagation, a reduction in material fatigue, and/or an increase in energy storage during impact.

The golf club head 10 described herein can comprise a body 24 and a strikeface 12. The body 24 defines a front, a rear opposite the front, a top rail 30, a sole 36 opposite the top rail 30, a sole leading edge 40 at a junction of the strikeface 12 and the sole 36, a toe end 42, a heel end 44 opposite the toe end 42, and a hosel 46 connected to the heel end 44. When the golf club is in an address position, the top rail 30 forms a top of the club head 10, and the sole 36 forms a bottom of the club head 10. The strikeface 12 comprises a geometric center 14. The strikeface 12 forms a striking surface for impacting a golf ball. In some embodiments, the strikeface 12 is formed by a faceplate, which fits into an indention in the front of the body 24.

The strikeface 12 can comprise a front surface 16 and a rear surface (not illustrated) opposite the front surface 16. The sole 36 can comprise a sole surface. At least a portion of the sole surface can be configured to engage the turf or ground when a golfer uses the golf club. The top rail 30 can comprise a top rail surface. The golf club head can be a driver, a fairway wood, a hybrid, or an iron type golf club head. Driver, fairway wood, and hybrid type club heads can comprise a crown rather than a top rail.

The golf club head 10 can be textured with one or more indention arrays 50, spread across one or more of the strikeface front surface 16, the strikeface rear surface, and/or the sole surface. Any indention array 50 can also be called a plurality of indentions, a textured array, a surface texturing, and/or a frictional geometry. The texture on the strikeface front surface 16, the strikeface rear surface, and/or the sole surface can be formed using a laser shock surface patterning (LSSP) process. As described below, the strikeface rear surface and/or the sole surface can be textured similar to the strikeface front surface 16. In some embodiments, only the strikeface front surface 16 is textured with indention array 50. In some embodiments, only the strikeface rear surface is textured with an indention array 50. In some embodiments, only the sole surface is textured with an indention array 50.

In other embodiments, the strikeface front surface 16 can have one or more pluralities of indentions 50. For example, the strikeface front surface 16 can be textured with a first plurality of indentions 50 (a first array) and the strikeface rear surface can be textured with a second plurality of indentions (a second array). In yet other embodiments, the strikeface front surface 16 can be textured with a first plurality of indentions 50 (a first array) and the sole surface can be textured with a second plurality of indentions (a second array). Alternately, the strikeface front surface 16 can be textured with a first plurality of indentions 50 (a first array), the strikeface rear surface can be textured with a second plurality of indentions (a second array), and the sole surface is textured with a third plurality of indentions (a third array). In some embodiments, a single textured surface can comprise multiple indention arrays 50.

The golf club head can be formed from a metal material. In some embodiments, the strikeface 12 can be formed from a different metal than the remainder of the club head 10. Examples of metals may include, for example, but not limited to, steel, steel alloy, stainless steel, stainless steel alloy, C300, C350, Ni (Nickel)-Co(Cobalt)-Cr(Chromium)-Steel Alloy, 8620 alloy steel, S25C steel, 303 SS, 17-4 SS, carbon steel, maraging steel, 565 Steel, AISI type 304 or AISI type 630 stainless steel, titanium alloy, Ti-6-4, Ti-3-8-6-4-4, Ti-10-2-3, Ti 15-3-3-3, Ti 15-5-3, Ti185, Ti 6-6-2, Ti-7s, Ti-9s, Ti-92, or Ti-8-1-1 Titanium alloy, amorphous metal alloy, or other similar metals. The material of the golf club head can affect the laser intensity needed to attain certain indention parameters, such as the maximum indention depths described below.

Strikeface Front Surface Texturing

Figure 2:
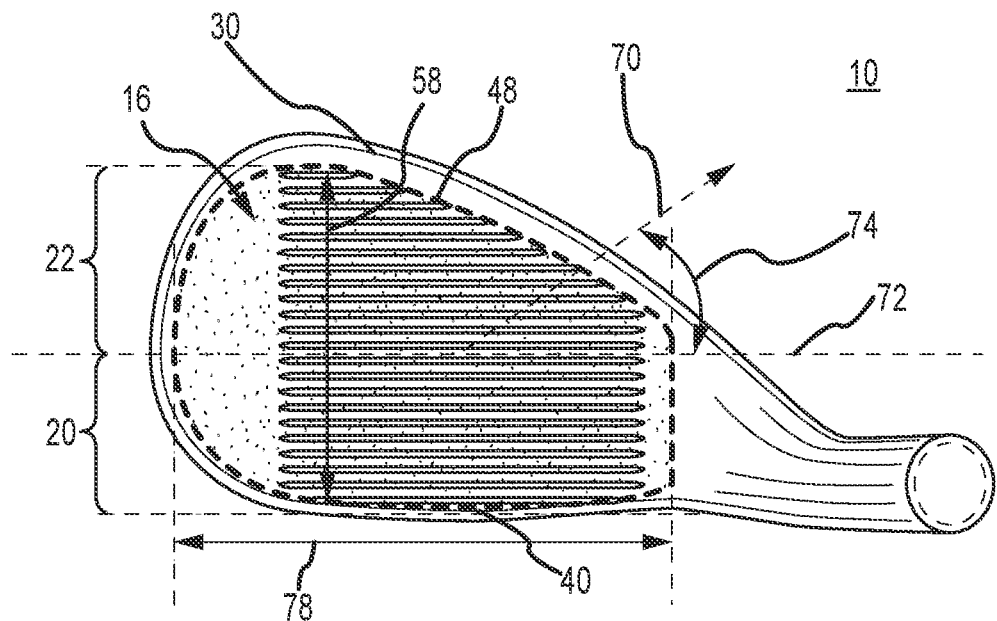
FIG. 2 shows a face-normal view of a wedge-type golf club head having a fully textured strikeface front surface, according to an embodiment.

Referring to FIGS. 2-5, the strikeface front surface 16 comprises a textured region 48. The textured region 48 can have a surface roughness that is different than the surface roughness of the remainder of the strikeface front surface 16. The different surface roughness of the textured region 48 can be created by applying a laser shock surface patterning (LSSP) process to the textured region 48 to create a plurality of indentions 50. The textured region 48 can cover between 20% and 100% of the strikeface front surface 16. In the embodiment of FIG. 2, the textured region 48 covers the entire front surface 16 (approximately 100% of the front surface 16). In some embodiments, the textured region 48 can cover between 20%-30%, 30%-40%, 40%-50%, 50%-60%, 60%-70%, 70%-80%, 80%-90%, or 90%-100% of the front surface 16. In some embodiments, the textured region 48 covers 20%, 25%, 30%, 35%, 40%, 45%, 50%, 55%, 60%, 65%, 70%, 75%, 80%, 85%, 90%, 95%, or 100% of the front surface 16.

Figure 3:
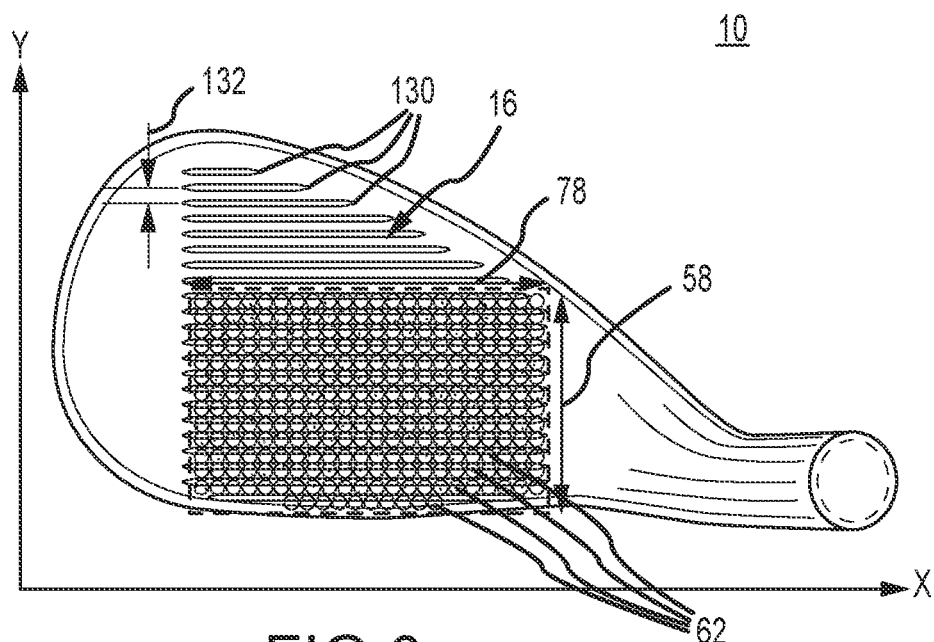
FIG. 3 shows a face-normal view of a wedge-type golf club head having a strikeface with a textured region on the strikeface front surface, according to an embodiment.

In some embodiments, such as the embodiment of FIG. 3, the textured region 48 can be located within only a portion of the strikeface 12 that also comprises conventional grooves 130. In other embodiments, a majority of the textured region 48 can be located in a low region 20 of the strikeface 12. The low region 20 can be any part of strikeface 12 below a horizontal reference axis 72 that extends through the geometric center 14 of the strikeface. In other embodiments, a majority of the textured region 48 can be located in a high region 22 of the strikeface 12. The high region 22 can be any part of strikeface 12 above the horizontal reference axis 72. In some embodiments, the textured region 48 can comprise a height 58, measured from the sole 36 to the top rail 30, greater than 0.2 inch, greater than 0.4 inch, greater than 0.6 inch, greater than 0.8 inch, greater than 1.0 inch, greater than 1.2 inch, greater than 1.4 inch, greater than 1.6 inch, greater than 1.8 inch, or greater than 2 inch. Positioning the textured region 48 primarily within the low region 20 or the high region 22 of the strikeface 12 can alter the spin imparted to the golf ball on low or high hits, respectively. In some embodiments, the strikeface front surface 16 can be selectively textured in certain regions to make a strikeface 12 that responds with roughly equivalent spin regardless of where the golf ball impacts the strikeface 12. Selectively texturing one or more portions of the strikeface front surface 16 can also alter the residual (internal) stress of the strikeface, changing the durability, the deformation characteristics, and the energy storage mechanics of the strikeface.

Figure 4:
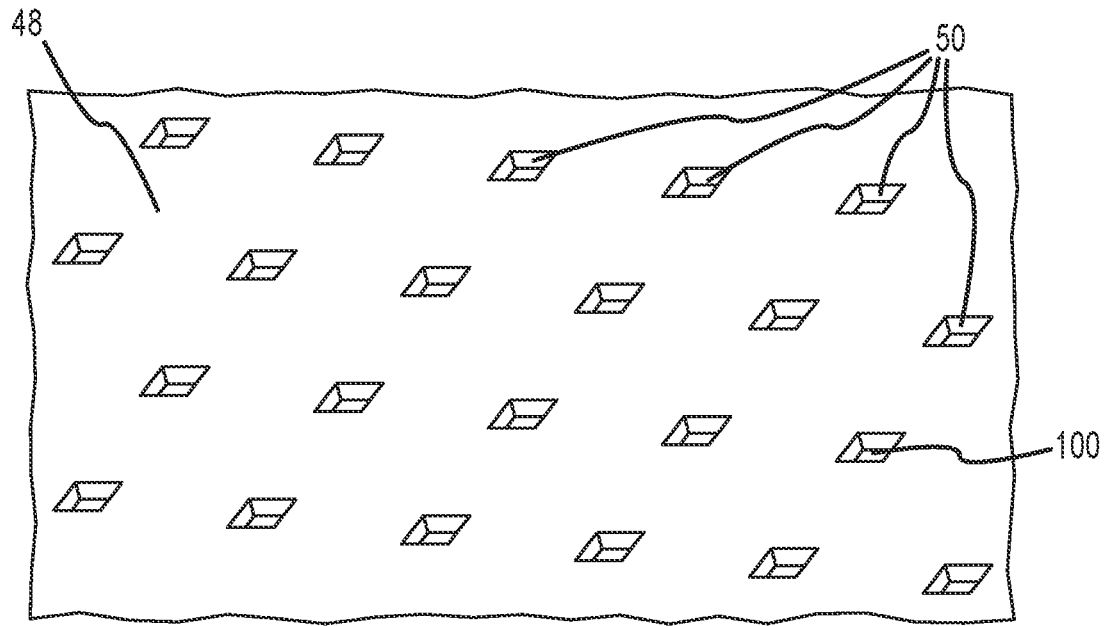
FIG. 4 shows a perspective view of an array of square indentions, according to an embodiment.
Figure 5:
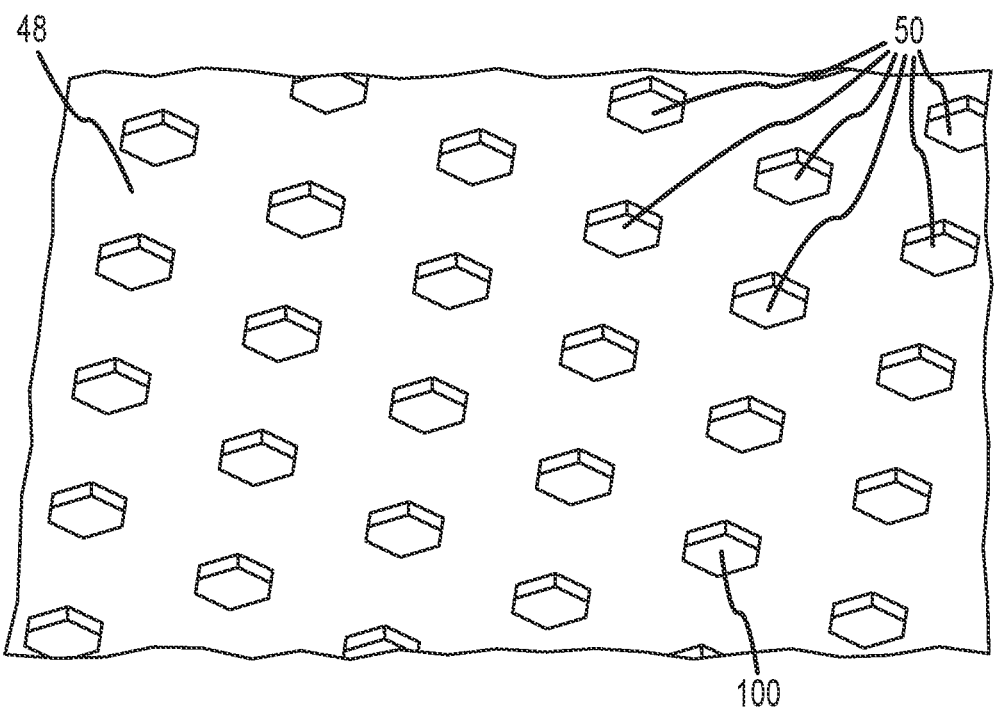
FIG. 5 shows a perspective view of an array of hexagonal indentions, according to an embodiment.

As illustrated in the closeup perspective views of FIGS. 4 and 5, the textured region 48 comprises a plurality of indentions 50 that give texture to the front surface 16. The plurality of indentions 50 can also be called an indention array. The plurality of indentions 50 can be positioned in a pattern throughout the textured region 48 and across at least a portion of the strikeface front surface 16. The plurality of indentions 50 can cover between 20% and 100% of the strikeface front surface 16, similar to the coverage of the textured region 50. In some embodiments, the plurality of indentions 50 can cover 20%-30%, 30%-40%, 40%-50%, 50%-60%, 60%-70%, 70%-80%, 80%-90%, or 90%-100% of the front surface 16. In some embodiments, the plurality of indentions 50 can cover 20%, 25%, 30%, 35%, 40%, 45%, 50%, 55%, 60%, 65%, 70%, 75%, 80%, 85%, 90%, 95%, or 100% of the front surface.

Referring to FIGS. 2, 4, and 5, the plurality of indentions 50 (indention array) can comprise multiple individual indentions 100 (also called "wells"). The plurality of indentions 50 can be arranged in any pattern and oriented in any direction across the club head. The layout of the plurality of indentions 50 can differ between embodiments. In some embodiments, the plurality of indentions 50 can be arranged in a pattern of rows. The plurality of indentions 50 can be further arranged in columns. The rows of indentions can be linearly oriented. An indention array orientation can be defined as a direction parallel to the linear orientation of the rows. The indention array orientation can be symbolized by an array axis 70. In some embodiments, the plurality of indentions 50 (indention array) can be horizontally oriented. Referring to FIG. 2, a horizontal reference axis 72 is shown extending through the geometric center 14 of the strikeface 12 from the heel end 44 to the toe end 42 of the club head 10. The array axis 70 (signifying the indention array orientation) can be offset by an angle of plus or minus 0 degrees to 90 degrees from the horizontal reference axis 72. In some embodiments, the array axis 70 is offset from the horizontal reference axis 72 by +/−10 degrees, +/−20 degrees, +/−30 degrees, +/−40 degrees +/−45 degrees, +/−50 degrees, +/−60 degrees, +/−70 degrees, +/−80 degrees, or +/−90 degrees.

In some embodiments, the rows of indentions can be arcuate or curved. The rows of indentions can be concave with respect to the sole 36, concave with respect to the top rail 30, concave with respect to the heel end 44, concave with respect to the toe end 42, concave with respect to an upper toe end, concave with respect to an upper heel end, concave with respect to a lower toe end, or concave with respect to a lower heel end of the club head. In some embodiments, the plurality of indentions can extend radially from the geometric center 14 of the strikeface 12. The plurality of indentions can form circular rows of increasing diameter about the geometric center 14 of the strikeface. Alternately, the plurality of indentions can form oval, elliptical, oblong, square, rectangular, triangular, or any other suitably shaped rows about the geometric center 14 of the strikeface 12. In some embodiments, the plurality of indentions is centered about a point offset from the geometric center 14 of the strikeface 12.

The plurality of indentions 50 can comprise an indention density of approximately 3,040 to 75,950 indentions per cm$^2$ (approximately 19,600 to 490,000 indentions per in$^2$). In some embodiments, the indention density can be approximately 3,000 to 5,000, 5,000 to 10,000, 10,000 to 30,000, 30,000 to 60,000, or 45,000 to 75,950 indentions per cm$^2$.

Referring to FIG. 3, in some embodiments, the textured region 48 can comprise multiple pocket regions 62 (also called laser spot regions/areas or laser covered regions/areas). Every pocket region 62 can correspond to the spot size of a laser beam used during the LSSP process. However, the LSSP process uses a mask layer (mesh) to protect portions of the surface being treated. Therefore, each pocket region 62 comprises a portion of masked (protected) surface area and a portion of exposed (unprotected) surface area. The exposed surface area becomes a plurality of indentions 50. Creation of the plurality of indentions 50 occurs because parts of the pocket region 62 are exposed to a plasma shockwave through apertures of the mask layer during LSSP. Because of the mask layer (mesh), each pocket region 62 can comprise a plurality of indentions 50. The pocket regions 62 can be circular, square, hexagonal, triangular, or any other suitable shape. The pocket regions 62 can be arranged in a pattern or array throughout the textured region 48. The pocket regions 62 can be located next to one another to form rows. The pocket region 62 rows can be positioned between the grooves 130, to texture the front surface 16 area between the grooves 130.

In some embodiments, the pocket regions 62 correspond to the spot size (diameter) of a laser beam used in the LSSP process. For circular pocket regions 62, each pocket region 62 can have a spot size (diameter) between 1 mm and 5 mm. In some embodiments, the spot size can be inclusively between 1 mm and 3 mm, 1.5 mm and 3.5 mm, 2 mm and 4 mm, 2.5 mm and 4.5 mm, 3 mm and 5 mm. For example, the spot size can be 1 mm, 1.5 mm, 2 mm, 2.5 mm, 3 mm, 3.5 mm, 4 mm, 4.5 mm, or 5 mm. In some embodiments, the pocket regions 62 can be spaced apart from one another by approximately 0.1 mm (100 µm) or less.

Each pocket region 62 can comprise between 10 and 15,500 indentions. In some embodiments, each pocket region 62 can comprise between 10 and 100, 100 and 500, 500 and 1000, 1000 and 5000, 5000 and 10,000, 10,000 and 15,500 indentions, or any intermediate range of indentions. For example, for circular pocket regions 62 with a 1 mm diameter, each pocket region 62 can comprise between approximately 10 and 610 indentions. For circular pocket regions 62 with a 5 mm diameter, each pocket region 62 can comprise between approximately 500 and 15,500 indentions. The pluralities of indentions 50 within the pocket regions 62 give roughness to the textured region 48, altering the resulting coefficient of friction between the textured region 48 and a golf ball.

Figure 6:
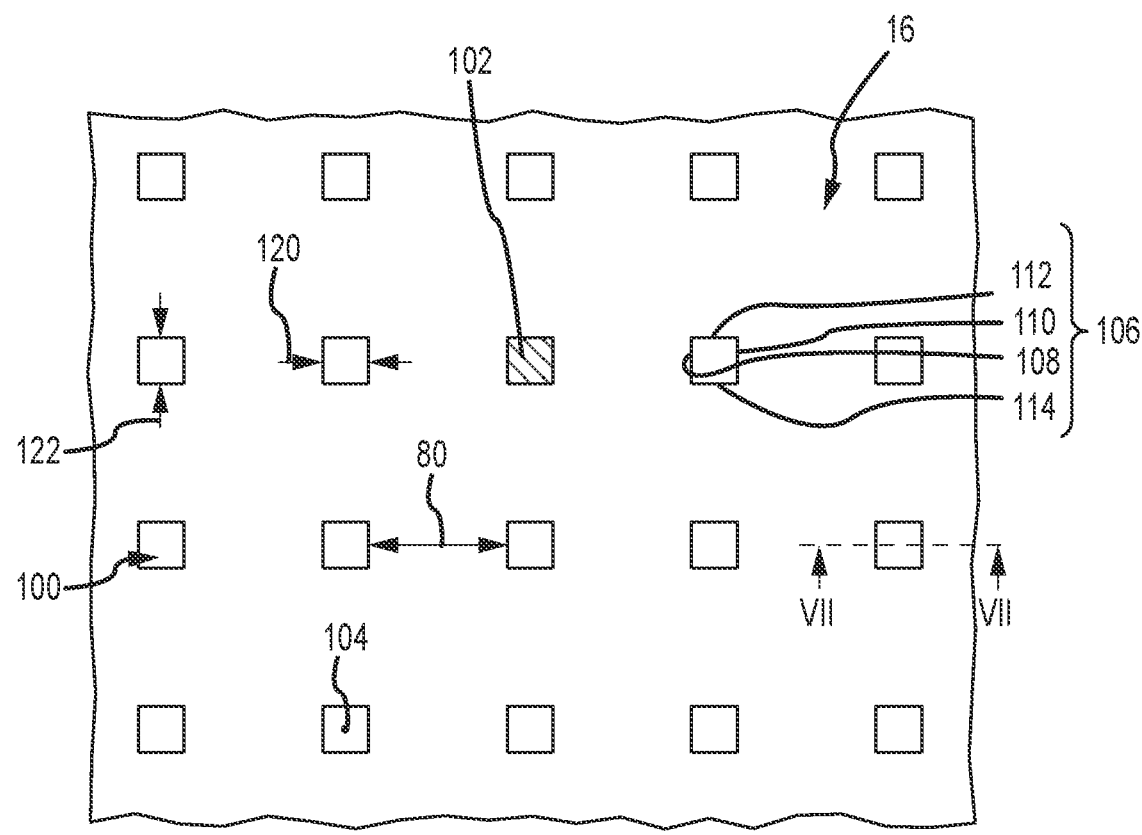
FIG. 6 shows a surface-normal view of the array of square indentions of FIG. 3.

Referring to FIGS. 4-6, each indention 100 of the plurality of indentions 50 comprises a footprint shape, as seen when viewed orthogonally from the strikeface front surface 16. The footprint shape can be a parallelogram, a rectangle, a square, a diamond (or rhombus), a circle, a triangle, a pentagon, a hexagon, or any other suitable shape. In some embodiments, the footprint shape can be a shape having one continuous side, two arcuate sides, three sides, four sides, five sides, six sides, seven sides, eight sides, nine sides, or ten sides. Each indention 100 comprises sidewalls 106, which extend into the front surface 16 to form the indention 100. Within a plane coincident with the front surface 16, the indention sidewalls 106 correspond to the sides of the footprint shape. In some embodiments, the plurality of indentions 50 can comprise indentions with different footprint shapes on the same strikeface. In some embodiments, one section of the strikeface 12 can have an array of a first indention shape and another section of the strikeface 12 can have an array of a second indention shape. For example, the first indention shape can be a hexagon, and the second indention shape can be a square. In some embodiments, a single array of indentions can comprise any combination of multiple footprint shapes. For example, a single array can comprise hexagons and triangles. For further example, a single array can comprise hexagons, squares, and triangles. For further example, a single array can comprise circles and squares. For further example, a single array can comprise rectangles and squares.

Referring to FIGS. 6 and 8, the footprint shape can bound a surface footprint area 102. In other words, the footprint area 102 is the area bounded by the indention sidewalls 106, within a plane coincident with the front surface 16. The footprint area 102 of each indention 100 can range between 0.01 µm$^2$ to 250,000 µm$^2$. In some embodiments, the footprint area 102 of each indention 100 can range between 0.01 µm$^2$ to 0.10 µm$^2$, 0.10 µm$^2$ to 0.20 µm$^2$, 0.20 µm$^2$ to 0.30 µm$^2$, or 0.30 µm$^2$, 0.40 µm$^2$, 0.40 µm$^2$ to 0.50 µm$^2$, 0.50 µm$^2$ to 1.0 µm$^2$, 1.0 µm$^2$ to 10 µm$^2$, 10 µm$^2$ to 50 µm$^2$, 50 µm$^2$ to 100 µm$^2$, 100 µm$^2$ to 200 µm$^2$, 200 µm$^2$ to 300 µm$^2$, 300 µm$^2$ to 400 µm$^2$, 400 µm$^2$ to 500 µm$^2$, 500 µm$^2$ to 600 µm$^2$, 600 µm$^2$ to 700 µm$^2$, 700 µm$^2$ to 800 µm$^2$, 800 µm$^2$ to 900 µm$^2$, 900 µm$^2$ to 1000 µm$^2$, 1000 µm$^2$ to 3000 µm$^2$, 3000

μm² to 6000 μm², 6000 μm² to 9000 μm², 9000 μm² to 12,000 μm², 12,000 μm² to 15,000 μm², 15,000 μm² to 30,000 μm², 30,000 μm² to 60,000 μm², 60,000 μm² to 100,000 μm², 100,000 μm² to 150,000 μm², 150,000 μm² to 200,000 μm², or 200,000 μm² to 250,000 μm². The small surface footprint area 102 also allows a portion of the strikeface 12 to be selectively treated without affecting the remainder of the strikeface 12.

Referring to FIG. 4-8, each indention 100 of the plurality of indentions 50 on the strikeface front surface 16 can each comprise a bottom surface 126 and sidewalls 106 (also called sides or edges). Some indentions 100 can have a first sidewall 108, a second sidewall 110 opposite the first sidewall 108, an upper sidewall 112, and a lower sidewall 114. The sidewalls 106 can have a sharp, crisp geometry, compared to sidewalls formed by the conventional LSP process. Referring to FIGS. 8A and 8B, the sidewalls 106 connect roughly perpendicularly to the strikeface front surface 16. The corner-like intersection between the sidewalls 106 and the strikeface front surface 16 can be slightly rounded.

The amount of curvature at the intersection between the sidewalls 106 and the front surface 16 can be characterized by a radius of curvature 116 of a reference circle that conforms to a cross-sectional outline of the intersection. The intersection's radius of curvature can also be called an exit radius. The radius of curvature 116 of the reference circle can be between 10 to 100 times less than a radius of curvature of an intersection of an indention formed by the LSP process. In some embodiments, the radius of curvature 116 can be 10 times, 20 times, 30 times, 40 times, 50 times, 60 times, 70 times, 80 times, 90 times, or 100 times less than a radius of curvature of an LSP-formed indention intersection (exit geometry). During an LSP process, each laser beam shock forms a single indention, without masking to block any part of the laser beam. The edges of the laser beam impart a mild forging action across a surface region that becomes the intersection or exit geometry of the indention. In other words, the LSP process creates indentions with sloped exit geometry rather than sharp exit geometry. Using the same laser intensity, the LSP process creates large, rounded indentions, whereas the LSSP process creates small, sharp indentions.

In the golf industry, media blasting is also used to texture surfaces. Media blasting relies on solid matter impacting the workpiece surface at high speeds to modify the morphology of the surface. Each particle of the solid matter can travel at unknown speeds and directions, leading to an overlapping of treatment, which flattens the surface. The peaks (any features higher than the starting elevation of the surface) and valleys (any feature lower than the starting elevation of the surface) can grow together, resulting in an undulating surface with sharp peaks. However, the repeated impact of the solid matter against the same surface areas and the size of the particles themselves, results in shallow valleys. Therefore, media blasting cannot provide both sharp edges and deep indentions for increased friction. In contrast, the LSSP process can provide indentions that are both deep and sharp (small radius of curvature at the intersection or exit edge).

Laser etching is another form of surface texturing used in the golf industry. Laser etching removes material from a surface by ablating the material into a vapor. The treated surface is transitioned from solid, to liquid, to gas, to liquid, and again to solid. As the metal re-solidifies, the metal is hardened. The morphology of a laser etched surface comprises shallow valleys and rounded peaks. The LSSP process can provide indentions that are both deep and sharp by using a mask layer (mesh) to guide and control a shockwave to create micro-features, referred to herein as indentions 100. Neither the LSP process, nor media blasting, nor laser etching can discretely control indention parameters, such as position, spacing (separation distance), and edge sharpness (intersection radius of curvature).

The sidewalls 106 can connect roughly perpendicularly to the indention bottom surface 126, similar to how they connect to the strikeface front surface 16. In other words, the sidewalls 106 can form a sharp a radius of curvature with the indention bottom surface 126.

Figure 7:
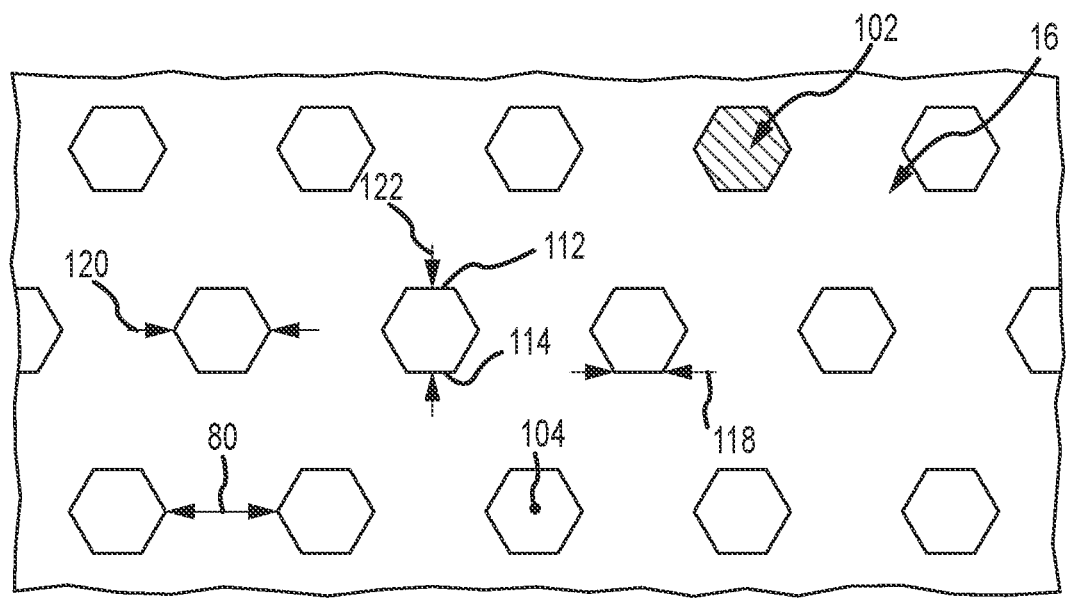
FIG. 7 shows a surface-normal view of the array of hexagonal indentions of FIG. 4.

Referring to FIGS. 6-8, in some embodiments, each indention 100 comprises a width 120 measured in a direction parallel to the array axis 70 of the indention array 50. In embodiments with horizontal rows of indentions, the width 120 is measured in a direction from the heel end 44 towards the toe end 42 (a heel-to-toe direction). In some embodiments, the width 120 can span from the first sidewall 108 to the second side wall 110 of the indention 100. The width 120 is measured through a center point of the indention 104. For example, the width of a circular indention equals the diameter of the circular indention. The indention width 120 can range between 0.1 μm and 500 μm (approximately $3.9 \times 10^{-6}$ inch and approximately 0.0197 inch). In some embodiments, the indention width 120 can range between 0.1 μm and 0.5 μm, 0.5 μm and 1 μm, 1 μm and 5 μm, 5 μm and 10 μm, 10 μm and 20 μm, 20 μm and 30 μm, 30 μm and 40 μm, 40 μm and 50 μm, 50 μm and 60 μm, 60 μm and 70 μm, 70 μm and 80 μm, 80 μm and 90 μm, 90 μm and 100 μm, 100 μm and 150 μm, 150 μm and 200 μm, 200 μm and 250 μm, 250 μm and 300 μm, 300 μm and 350 μm, 350 μm to 400 μm, 400 μm to 450 μm, and 450 μm to 500 μm. In some embodiments, the indention width can be 0.1 μm, 0.5 μm, 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, or 500 μm. In some embodiments, such as the plurality of hexagonal indentions shown in FIG. 7, each indention 100 can comprise a side width 118 (also called a sidewall length) that is less than the width 120 measured through the center 104 of the indention 100.

Referring to FIGS. 6 and 7, in some embodiments, each indention 100 comprises a height 122 measured in a direction perpendicular to the array axis 70 of the indention array 50. In some embodiments, the width 122 spans between the upper sidewall 112 and the lower sidewall 114. For indention arrays 50 that are oriented horizontally, the indention height 122 can be measured along the strikeface front surface 16 in a direction from the sole leading edge 40 of the club head towards the top rail 30. The indention height 122 can be the same as the indention width 120, for some indentions 100.

The indention height 122 can range between 0.1 μm and 500 μm (approximately $3.9 \times 10^{-6}$ inch and approximately 0.0197 inch). In some embodiments, the indention height 122 can range between 0.1 μm and 0.5 μm, 0.5 μm and 1 μm, 1 μm and 5 μm, 5 μm and 10 μm, 10 μm and 20 μm, 20 μm and 30 μm, 30 μm and 40 μm, 40 μm and 50 μm, 50 μm and 60 μm, 60 μm and 70 μm, 70 μm and 80 μm, 80 μm and 90 μm, 90 μm and 100 μm, 100 μm and 150 μm, 150 μm and 200 μm, 200 μm and 250 μm, 250 μm and 300 μm, 300 μm and 350 μm, 350 μm to 400 μm, 400 μm to 450 μm, and 450 μm to 500 μm. In some embodiments, the indention height 122 can be 0.1 μm, 0.5 μm, 1 μm, 5 μm, 10 μm, 20 μm, 30

μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, or 500 μm.

Figure 8A:
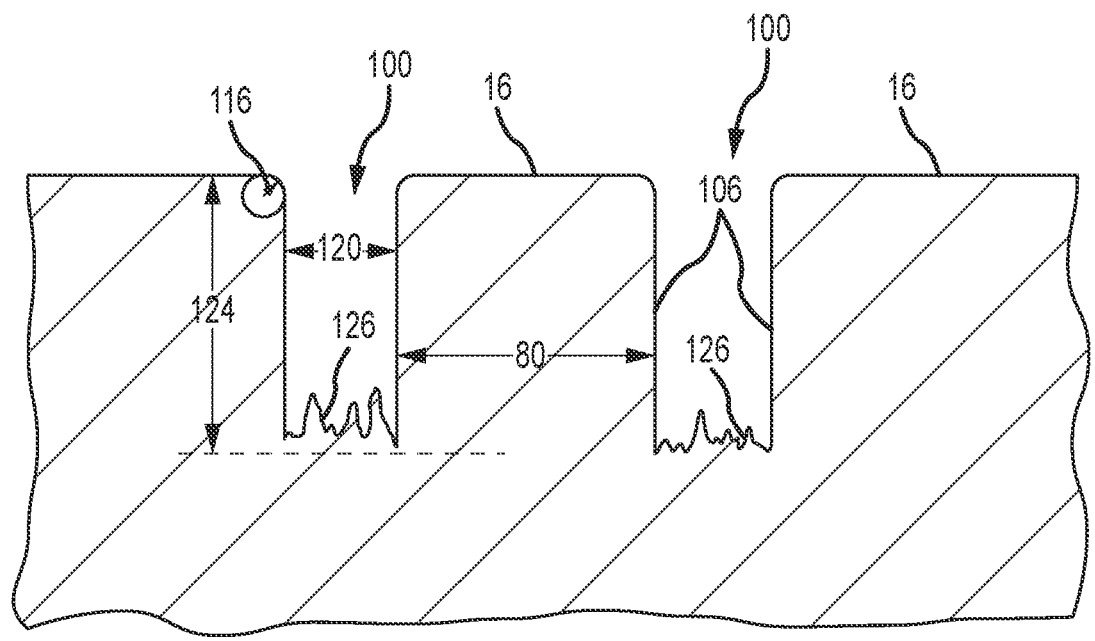
FIG. 8A shows a cross-sectional view of the array of square indentions of FIG. 3, taken along line VI-VI of FIG. 6, according to a first embodiment.
Figure 8B:
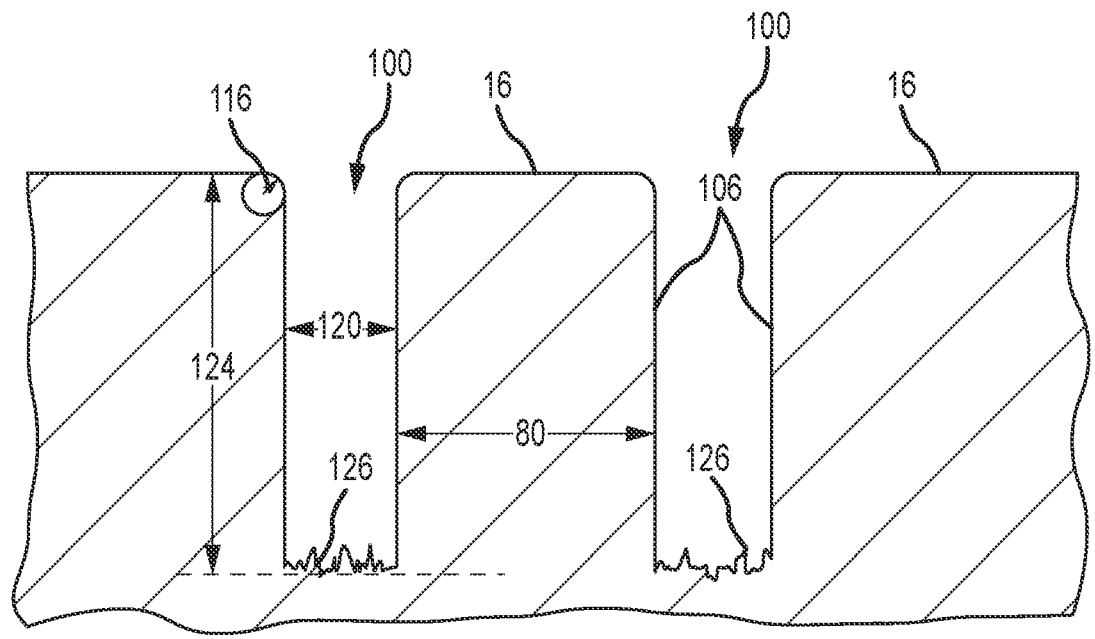
FIG. 8B shows a cross-sectional view of the array of square indentions of FIG. 3, taken along line VI-VI of FIG. 6, according to a second embodiment with deeper indentions than the first embodiment of FIG. 8A.

Referring to FIGS. 8A and 8B, each indention 100 comprises a maximum depth 124. The embodiment of FIG. 8B has deeper indentions, with a greater maximum depth 124, than the FIG. 8A embodiment. The indention maximum depth 124 can be measured orthogonal to the strikeface front surface 16. In other words, the indention maximum depth 124 can be measured from a plane coincident with the strikeface front surface 16 to the indention bottom surface 126. Each indention maximum depth 124 can range between 0.1 μm to 15 μm. In some embodiments, the indention maximum depth 124 can range between 0.1 μm to 0.5 μm, 0.5 μm to 0.9 μm, 0.8 μm to 1.2 μm, 1.0 μm to 3.0 μm, 3.0 μm to 5.0 μm, 5.0 μm to 7.0 μm, 7.0 μm to 9.0 μm, 9.0 μm to 11 μm, 11 μm to 13 μm, 13 μm and 15 μm. In some embodiments, the maximum indention depth can be 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, 11 μm, 12 μm, 13 μm, 14 μm, or 15 μm. The depth 124 of each indention 100 affects the coefficient of friction of the strikeface front surface 16.

When the indentions 100 are formed by laser shock treatment (LSSP), the depth 124 of each indention 100 correlates to the intensity of the laser beam. The maximum indention depth 124 can vary slightly for different strikeface materials. For a polished carbon steel strikeface, the indention depths 124 described above can be achieved by a laser intensity ranging up to 2000 GW/cm², up to 1500 GW/cm², up to 1000 GW/cm², up to 500 GW/cm², up to 250 GW/cm², up to 100 GW/cm², up to 50 GW/cm², up to 25 GW/cm², up to 10 GW/cm², up to 5 GW/cm², or up to 1 GW/cm². For some LSSP processes, the maximum indention depth for a given laser beam intensity can be approximated through the following equation:

$$y=0.0075x+0.5949$$

where "x" is the intensity of the laser beam and "y" is the approximate maximum indention depth 124, resulting from the use of the given laser beam intensity in the LSSP process.

Each indention 100 comprises a bottom surface 126. In some embodiments, the indention bottom surface 126 can have a non-uniform profile with ridges, valleys, and other complex geometries. In some embodiments, the indention bottom surface 126 can comprise a shockwave shape having curved contours. The shockwave shape and/or the non-uniform profile can be created through the laser shock surface patterning (LSSP) process described below. The contours of the bottom surface 126 can vary due to the grain structure at the indention site prior to treatment and/or due to the composition of the absorptive layer used in the LSSP process. For instance, if the absorptive layer comprises large particles, the power of the shockwave will be greater, which affects the shaping of the indention bottom surface 126.

Figure 9:
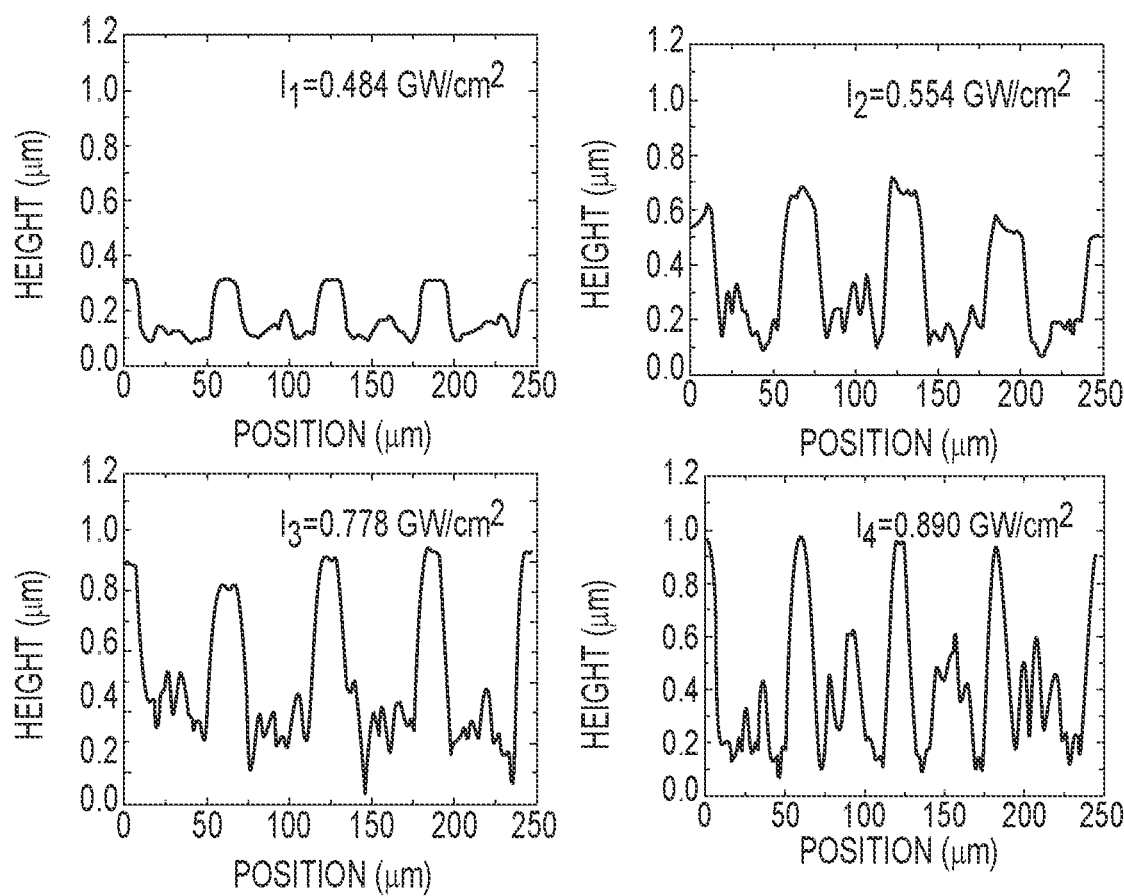
FIG. 9 shows a depth graph of four example surface profiles (a), (b), (c), and (d), formed by shockwaves from different laser intensities.
Figure 10:
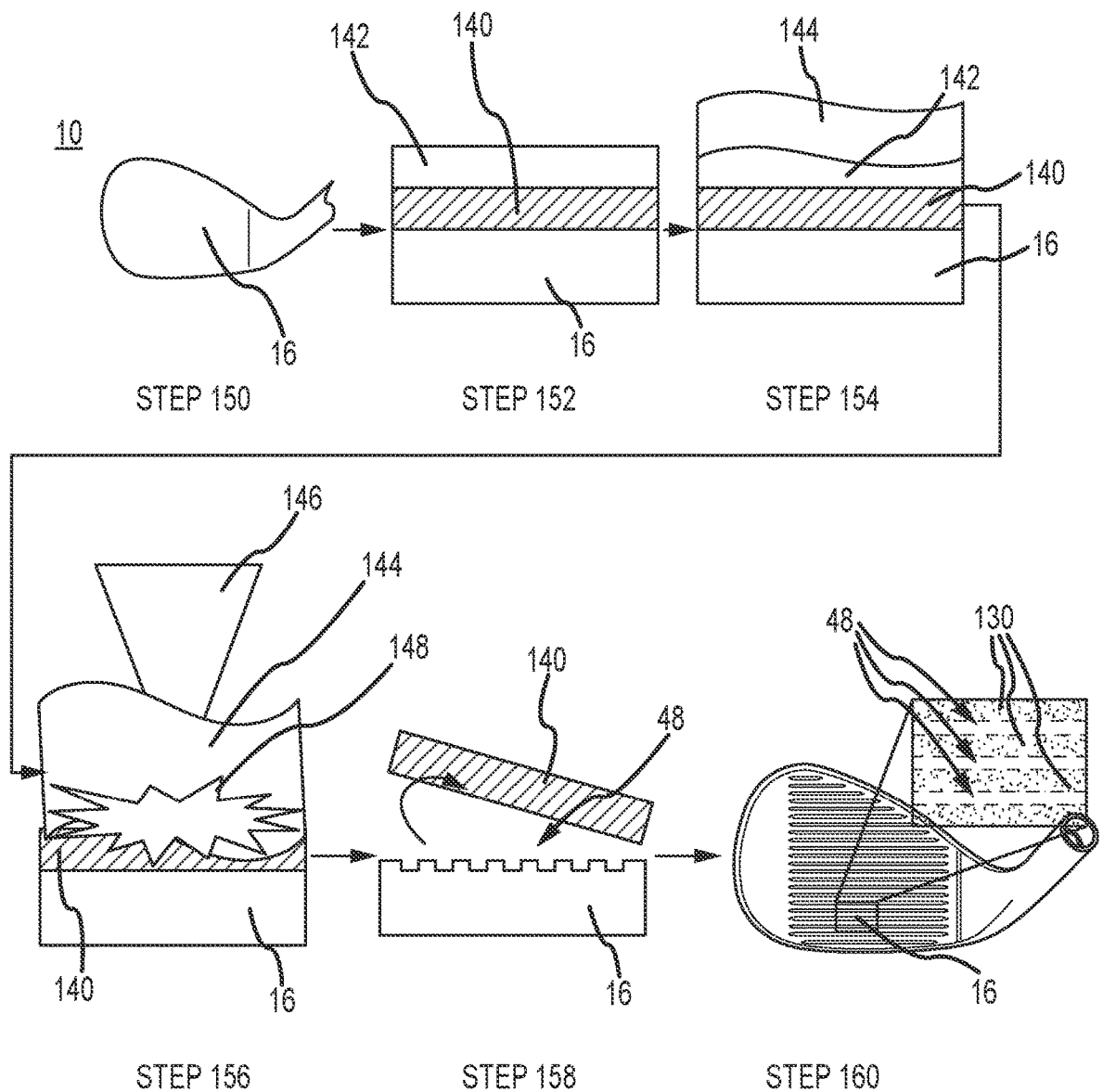
FIG. 10 shows a method of treating the face of a wedge using a laser shock surface patterning (LSSP) process.
Figure 11:
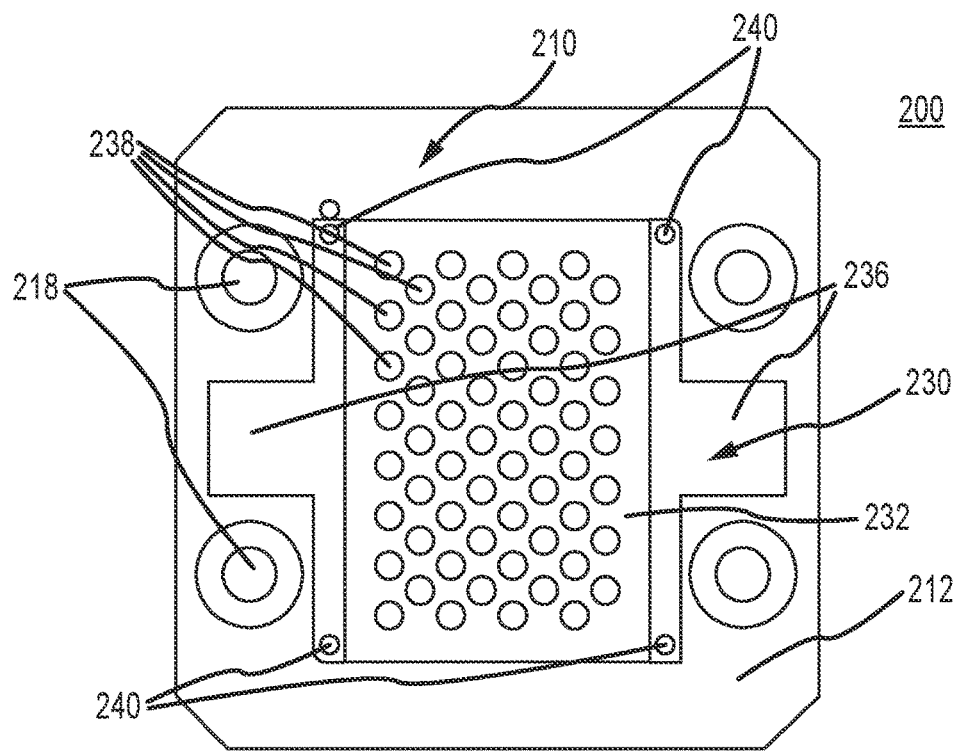
FIG. 11 shows a top view of a production apparatus comprising a foundation plate and a frame, according to an embodiment.

FIG. 9 illustrates the results of an experiment recorded in the publication Mao, Bo & Siddaiah, Arpith & Menezes, Pradeep & Liao, Yiliang. (2018). 'Surface Texturing by indirect laser shock surface patterning for manipulated friction coefficient,' Journal of Materials Processing Tech. vol. 257 (2018) pp. 227-233), which is incorporated herein in its entirety by reference. Since the graphs have not been modified from their original source, the "Height (μm)" vertical axes correspond to the herein defined "indention depth" measurement. FIG. 9 illustrates four example surface profiles of surfaces each having a plurality of indentions. The first example surface profile (a) was created by laser shock surface patterning a polished carbon steel square plate with a laser intensity of 0.484 GW/cm². The first surface profile (a) shows a pattern of indentions with consistent depths (roughly 0.2 μm) and widths. A bottom surface of each indention shows a slight protrusion in the center of each bottom surface. The second example surface profile (b) was created by laser shock surface treating a polished carbon steel square plate with a laser intensity of 0.554 GW/cm². The second surface profile (b) has indentions with a greater depth (roughly 0.5 μm). The bottom surface of each indention is slightly more erratic than in the first surface profile (a).

The third example surface profile (c) was created by laser shock surface treating a polished carbon steel square plate with a laser intensity of 0.778 GW/cm². The fourth example surface profile (d) was created by laser shock surface patterning a polished carbon steel square plate with a laser intensity of 0.890 GW/cm². The third and fourth example surface profiles (c) and (d) comprise progressively greater depths than profiles (a) and (b). The third and fourth profiles (c) and (d) comprise peaks and erratic textures extending from the bottom surfaces. The effect of laser intensity on surface profile is further discussed below.

The plurality of indentions 50 of the treated region 40 can be characterized by an aspect ratio of indention depth 124 over indention width 120. The aspect ratio can range between 3 and 150. In some embodiments, the aspect ratio can range between 3 and 5, 5 and 10, 10 and 20, 20 and 30, 30 and 40, 40 and 50, 50 and 60, 60 and 70, 70 and 80, 80 and 90, 90 and 100, 100 and 110, 110 and 120, 120 and 130, 130 and 140, 140 and 150, 3 and 25, 25 and 50, 50 and 75, 75 and 100, 100 and 125, 125 and 150, 3 and 50, 25 and 75, 50 and 100, 75 and 125, 100 and 150, 3 and 100, 25 and 125, or 50 and 150. A higher aspect ratio correlates to a rougher surface and a higher coefficient of friction. For aspect ratios greater than 6, "micro-effects" and "nano-effects" occur, causing the performance of the plurality of indentions 50 to be better than expected.

Referring again to FIG. 2, the plurality of indentions 50 (indention array) can be positioned in a pattern across the front surface 16. The indention array 50 can comprise a length 78, measured in a heel-to-toe direction. In some embodiments, the array length 78 is limited by the size of the strikeface 12. In some embodiments, such as in FIG. 3, the array length 78 can be equal to a length of one or more face grooves 130, described further below. The array length 78 can be between 1.5 inches and 2.5 inches. In some embodiments, the array length 78 is between 1.5 inches and 2.0 inches, 1.8 inches and 2.2 inches, or 2.0 inches and 2.5 inches. In some embodiments, the array length can be 1.5 inches, 1.6 inches, 1.7 inches, 1.8 inches, 1.9 inches, 2.0 inches, 2.1 inches, 2.2 inches, 2.3 inches, 2.4 inches, or 2.5 inches.

Referring to FIGS. 6-8, the indentions 100 may be spaced apart from each other by a separation distance 80 to create the indention array 50. The separation distance 80 can be between 1 μm and 250 μm (approximately 3.9×10⁻⁵ inch and approximately 0.0098 inch). In some embodiments, the separation distance 80 can be between 1 μm and 25 μm, 25 μm and 75 μm, 75 μm and 125 μm, 125 μm and 175 μm, 175 μm and 225 μm, or 225 μm and 250 μm. In some embodiments, the separation distance 80 can be 25 μm, 50 μm, 75

μm, 100 μm, 125 μm, 150 μm, 175 μm, 200 μm, 225 μm, or 250 μm. The separation distance 80 affects the density of indentions across the array 50 and consequently changes the properties of the front surface 16, such as the coefficient of friction.

Multiple regions of the strikeface 12 can be treated to have indentions 100 with different sizes and/or depths to give regions of the strikeface different friction coefficients. Furthermore, the plurality of indentions 50 may be arranged or arrayed in various patterns, including similar or different shapes, to alter the coefficient of friction, the hardness, and/or the aerodynamic properties of the surface. For example, in some embodiments, the indentions 100 may be arrayed in a second pattern (second array) such that they are spaced apart more than in a first pattern (first array).

In addition to the indention array 50, the strikeface front surface 16 can further comprise conventional grooves 130. The grooves 130 can run in a heel-to-toe direction, generally horizontal when the club is in the address position. The grooves 130 can be spaced apart from each other in the crown-to-sole (or top rail-to-sole) direction. The grooves 130 can be spaced apart by a groove pitch 132 (distance of separation) between 2 millimeters (mm) and 3 mm (0.08 inch and 0.12 inch). In some embodiments, the groove pitch 132 is between 2 mm and 2.2 mm, 2.2 mm and 2.4 mm, 2.4 mm and 2.6 mm, 2.6 mm and 2.8 mm, or 2.8 mm and 3.0 mm. In some embodiments, the groove pitch 132 can be 2 mm, 2.3 mm, 2.4 mm, 2.5 mm, 2.6 mm, 2.7 mm, 2.8 mm, 2.9 mm, or 3.0 mm. The indention array 50 can fill or partially fill land areas between the grooves 130. In some embodiments, the grooves 130 can have a constant width (measured crown-to-sole/top rail-to-sole) and constant land area between grooves 130. In other embodiments, the grooves 130 can have a varying width and varying land area between grooves 130.

Strikeface Rear Surface Texturing

As described above, one or more of the strikeface front surface 16, the strikeface rear surface, and the sole surface can be textured. The strikeface rear surface can comprise at least one textured region, similar to the textured region 48, described above. The textured region can comprise a plurality of indentions that give texture to the rear surface (not illustrated). The rear surface plurality of indentions can be similar to the front surface 16 plurality of indentions 50. Similar to the textured front surface, the textured region on the rear surface can cover between 20% and 100% of the strikeface. In some embodiments, the textured region can cover 20%-30%, 30%-40%, 40%-50%, 50%-60%, 60%-70%, 70%-80%, 80%-90%, or 90%-100% of the rear surface. In some embodiments, the textured region can cover 20%, 25%, 30%, 35%, 40%, 45%, 50%, 55%, 60%, 65%, 70%, 75%, 80%, 85%, 90%, 95%, or 100% of the rear surface. Selectively texturing one or more portions of the rear surface can alter the residual stress of rear surface, improving the durability, the deformation characteristics, and the energy storage mechanics of the strikeface 16.

The plurality of indentions on the strikeface rear surface can comprise footprint shapes, footprint shape areas, indention widths, indention heights, and indention depths similar to the respective properties described above for the front surface indentions 100. In some embodiments, the strikeface rear surface can have an array of a first indention shape and another section of the rear surface with an array of a second indention shape. In some embodiments with both a textured strikeface front surface and rear surface, the indention shape on the front surface can be different than the indention shape on the rear surface. In other embodiments with both a textured front and rear surface, the indention shape on the front and rear surface can be identical. Multiple regions of the rear surface can be treated to have indentions with different sizes and/or heights to give regions of the rear surface different grain structure, residual stress, and/or hardness.

As described above, the plurality of indentions can be positioned in an array or pattern across the rear surface in a manner similar to the array 50 on the front surface 16. The rear surface array length and/or separation distance between indentions can be similar to those described above for the strikeface front surface 16. The separation distance affects the density of indentions across the array and consequently changes the properties of the rear surface, such as the durability.

Sole Surface Texturing

In some embodiments, the sole surface comprises a plurality of indentions that give texture to the sole 36. The sole surface can comprise at least one textured region, similar to the textured region 48, described above. The textured region can comprise a plurality of indentions that give texture to the sole surface. The sole surface plurality of indentions (not illustrated) can be similar to the front surface and rear surface pluralities of indentions. Similar to the textured front surface and textured rear surface, the sole surface textured region can cover between 20% and 100% of the sole surface. In some embodiments, the sole textured region can cover 20%-30%, 30%-40%, 40%-50%, 50%-60%, 60%-70%, 70%-80%, 80%-90%, or 90%-100% of the sole surface. In some embodiments, the sole texture region can cover 20%, 25%, 30%, 35%, 40%, 45%, 50%, 55%, 60%, 65%, 70%, 75%, 80%, 85%, 90%, 95%, or 100% of the sole surface. Selectively texturing one or more portions of the sole surface can alter the coefficient of friction, hardness, and/or aerodynamic properties of the sole surface. The altered coefficient of friction can improve turf interaction between the sole surface and the ground. The increased hardness of the sole surface can improve the durability of the sole. The altered aerodynamic properties can reduce drag and increase swing speed.

The plurality of indentions on the sole surface can comprise footprint shapes, footprint shape areas, indention widths, indention heights, and indention depths similar to the respective properties described above for the front and rear surface indentions. In some embodiments, the sole surface can have an array of a first indention shape and another section of the sole surface with an array of a second indention shape. In embodiments with both a textured strikeface and a textured sole, the strikeface indention shape can be different than or identical to the sole indention footprint shape. In some embodiments, multiple regions of the sole surface can be treated to have indentions with different sizes and/or depths to give regions of the sole surface different grain structure and/or different residual stress. The multiple treated regions of the sole surface can have different hardness values. The indention depth of the array on the sole surface can also affect the aerodynamic response and turf interaction of the sole surface.

As described above, the plurality of indentions can be positioned in an array or pattern across the sole 36. The sole surface indention array can cover a portion of the sole or the entire sole 36. The sole surface indention array can comprise a length, measured in a heel-to-toe direction. In some embodiments, the array length is limited by the size of the sole 36. In some embodiments, the sole array length can be longer than the strikeface front or rear surface array length. The sole array length can be between 1.5 inches and 3.5 inches. In some embodiments, the array length is between 1.5 inches and 2.0 inches, 1.8 inches and 2.2 inches, 2.0 inches and 2.5 inches, 2.5 inches and 3.0 inches, or 3.0 inches and 3.5 inches. In some embodiments, the array length is 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, 3.0 inches, 3.1 inches, 3.2 inches, 3.3 inches, 3.4 inches, or 3.5 inches.

The indentions of the plurality of indentions may be spaced apart from each other by a separation distance to create the sole surface indention array. The sole surface plurality of indentions can be spaced apart by a separation distance similar to the separation distance 80 described above for the strikeface front surface indention array 50. The separation distance affects the density of indentions across the array and consequently changes the properties of the sole surface, such as the durability, aerodynamics, and/or turf interaction.

Alternate Embodiments with Crown Surface Texturing

In alternate embodiments (not illustrated), other body surfaces on the golf club head can be textured. For example, in wood-type golf club heads (driver, fairways, and hybrids), a crown surface of the club head can comprise at least one textured region, having a plurality of indentions that give texture to the crown. In wood-type embodiments with a textured crown surface, the array width can be between 1.5 inches and 4.5 inches. In some embodiments, the array length is between 1.5 inches and 2.0 inches, 1.8 inches and 2.2 inches, 2.0 inches and 2.5 inches, 2.5 inches and 3.0 inches, 3.0 inches and 3.5 inches, 3.5 inches and 4.0 inches, or 4.0 inches and 4.5 inches. In some embodiments, the array width is 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, 3.0 inches, 3.1 inches, 3.2 inches, 3.3 inches, 3.4 inches, or 3.5 inches, 3.6 inches, 3.7 inches, 3.8 inches, 3.9 inches, 4.0 inches, 4.1 inches, 4.2 inches, 4.3 inches, 4.4 inches, or 4.5 inches. All other parameters of the crown indention array, such as indention width, indention height, indention depth, and separation distance, can be similar to the respective parameters of the strikeface front surface indention array 50.

Properties, Characteristics, and Performance

The textured or treated surfaces of the golf club head can exhibit coefficients of friction, roughness, hardness, material grain structures, and/or residual stresses unlike untreated surfaces. One or more of these parameters can affect spin rate, launch angle, and/or ball speed. Further advantages can include efficient and speedy manufacturability, increased material fatigue resistance, and/or increased wear resistance.

The size and shape of the indentions on the front surface 16, the rear surface, and/or the sole surface can determine coefficient of friction for each of these surfaces. The coefficient of friction between a urethane covered golf ball and the textured front surface, the textured rear surface, and/or the textured sole surface can range between 0.05 and 0.95. In some embodiments, the textured surface coefficient of friction between a urethane covered golf ball and the textured surface can range between 0.10 and 0.30, 0.40 and 0.95, 0.40 and 0.50, 0.50 and 0.60, 0.60 and 0.70, 0.70 and 0.80, 0.80 and 0.90, or 0.85 and 0.95. In some embodiments, the textured surface coefficient of friction can be 0.10, 0.15, 0.20, 0.25, 0.30, 0.35, 0.40, 0.45, 0.50, 0.55, 0.60, 0.65, 0.70, 0.75, 0.80, 0.85, 0.90, or 0.95. In some embodiments, the textured surface coefficient of friction can be less than 0.1, less than 0.2, less than 0.3, less than 0.4, less than 0.5, less than 0.6, less than 0.7, less than 0.8, less than 0.9, or less than 0.95.

In some embodiments, the treated strikeface front surface 16 and/or sole surface comprises a higher coefficient of friction than an untreated strikeface and/or sole, respectively. In other embodiments, the treated strikeface front surface 16 and/or sole surface comprises a lower coefficient of friction than an untreated strikeface and/or sole, respectively. In embodiments where the indentions are formed by laser shock surface treatment (LSSP), the coefficient of friction of the textured surface is determined by the laser intensity used during manufacturing. The strikeface coefficient of friction controls the spin imparted to a golf ball upon impact. The sole coefficient of friction affects the turf interaction between the sole surface and the ground.

The coefficient of friction between the ball and the strikeface 12 controls the spin rate imparted to a golf ball at impact. The loft angle of the club head 10 can change the relationship of the strikeface coefficient of friction and the golf ball spin rate. In low-lofted clubs, a higher coefficient of friction can lead to a lower spin rate imparted to the ball, whereas in high-lofted clubs, a higher coefficient of friction can lead to a higher spin rate imparted to the ball. In most low-lofted club heads, a lower spin is desirable because it can lead to a longer carry distance. For example, lower spin increases the carry distance for a driver-type club and allows the golf ball to roll forward after landing. However, for high-lofted clubs, a higher spin rate lengthens ball flight. A higher spin rate can also causes the ball to sit or roll slightly backward upon landing, which increases shot precision.

In addition to the loft angle affecting the relationship between the coefficient of friction and the spin rate, the conditions under which the shot is taken can also affect the relationship between the coefficient of friction and the spin rate. In particular, for high-lofted club heads under dry conditions, the imparted ball spin rate can be unaffected by adding texture to the strikeface front surface. However, in wet conditions, the imparted ball spin rate can be increased by texturing the strikeface front surface 16. The added texture can increase the spin rate by up to 2000 revolutions per minute (rpm). In some embodiments, the texture described herein can increase the spin rate under wet conditions by between 500 rpm to 2000 rpm, 500 rpm to 700 rpm, 700 rpm to 900 rpm, 900 rpm to 1100 rpm, 1100 rpm to 1300 rpm, 1300 rpm to 1500 rpm, 1500 rpm to 1700 rpm, 1700 rpm to 1900 rpm, or 1800 rpm to 2000 rpm. In some embodiments, under wet conditions, the added texture can increase the spin rate by between 5% and 30%, more specifically between 5% and 10%, 10% and 15%, 15% and 20%, or 20% and 30%. In some embodiments, the added texture can increase the spin rate by approximately 13.5%. Since dew or other moisture often settles and remains on grass, wet conditions tend to be more commonly encountered during golf. Therefore, improving the spin rate and other performance parameters under wet conditions is especially important to a golfer.

The increased ball spin improves shot accuracy by helping the golf ball to stick close to the location where it impacts the ground, rather than rolling forward. Furthermore, strikefaces lacking the herein described texture tend to induce lower spin rates under wet conditions than under dry conditions. For a club head with the herein described texture, the induced spin rate can be roughly equivalent under wet and dry conditions. The similarity in spin rate between wet and dry conditions can improve a golfer's ability to predict their shot distance.

Texturing the strikeface front surface 16 can also decrease the launch angle of a golf ball under wet conditions. In wet conditions, the strikeface front surface texture can decrease the launch angle by between 1 to 3 degrees, compared to a strikeface lacking the herein described texture. In some embodiments, the strikeface front surface texture can decrease launch angle by between approximately 1 to 1.5 degrees, 1.5 degrees to 2.0 degrees, 2.5 degrees to 3.0 degrees. Reducing the launch angle can improve shot performance for a wedge or iron type club head. Texturing the strikeface front surface 16 can also increase the potential ball speed imparted to a golf ball under wet conditions. On average, the strikeface front surface texture does not negatively affect ball speed.

In some embodiments, textured or treated surfaces can comprise a Vickers hardness (HV) from 70 to 90, 70 to 75, 75 to 80, 80 to 85, 85 to 90, or 75 to 85. The textured or treated surfaces can have a Vickers hardness (HV) that is 10 to 20 points greater than the hardness of an untreated surface. In some embodiments, the hardness and the fine grain structure of the plurality of indentions can reduce crack initiation and slow crack propagation on the strikeface front surface. In other words, the potential ball speed achievable by an untextured strikeface is maintained after texturing the strikeface front surface 16.

As described above, the textured or treated surfaces of the golf club head can exhibit coefficients of friction, material grain structures, hardness, and/or residual stresses different than untreated surfaces. One or more of the front surface, the rear surface, and/or the sole surface (i.e. the treated surface(s)) can comprise a fine grain structure. The laser shock surface patterning process that creates the indentions on the treated surface can alter the grain structures of the material. When the treated surface undergoes a micro-forging process, the dislocations or voids at the grain boundaries are permanently compressed. This creates a finer grain structure than the original grain structure. The fine grain structure causes the treated surface to resist crack initiation and propagation because the voids at the grain boundaries are compressed. In other words, forging indentions in the strikeface can increase the fatigue resistance of the face, causing the club head to endure a greater number of impacts with a golf ball before failure.

The textured or treated surface can comprise compressive residual stress. In embodiments with a treated strikeface rear surface, compressive stress, created by the micro-forged indentions, can offset tension stress imparted to the rear surface during impact. This offset of tension stress can make the strikeface more durable and better able to store impact energy.

Employing the LSSP process can also relieve stress within weld zones. Strikefaces are often welded into a club head body to create a full golf club head. The resulting weld zones or heat-affected zones (HAZ) comprise stressed metal material that is more prone to failure than adjacent metal components. Treating the weld zones or HAZ with LSSP can improve durability by relieving stress within the welded metal material. The laser shock surface patterning process micro-forges the treated surface, which alters the texture, hardness, and material grain structure of the surface.

Finally, texturing one or more surfaces of a golf club head using LSSP can improve the aerodynamic properties of the treated surfaces. The use of texturing for aerodynamic benefit is especially useful for the crown surface and/or the sole surface. The altered surface structure created by LSSP can improve laminar flow of air over the surface. By improving laminar flow over the crown and/or sole surface, the overall drag on the club head can be reduced, increasing swing speed and resultant ball speed.

Method

Referring to FIG. 9, a method of manufacturing the strikeface, described above, comprises: providing a golf club head with a strikeface, which in some embodiments is a strikeface (step 150), placing a mask layer on the strikeface front surface, and applying an absorptive layer (or ablative layer) over the mask layer (step 152), placing a confinement layer over the absorptive layer (step 154), concentrating a laser beam over a spot on the strikeface to forge an array or a portion of an array of indentions by laser shocking the absorptive layer (step 156), aiming the laser at an untreated spot of the strikeface and repeating steps 154 and 156 until the desired portion of the strikeface front surface is treated, removing the confinement layer and the mask layer (step 158), and cleaning the strikeface, if necessary. For the sake of the following discussion, the reference numerals used above for golf club head 10 are also used in this method description. However, the method of manufacturing the strikeface is not limited to the specific wedge-type golf club head 10.

In step 150 of the process, providing the strikeface 12 can comprise casting, forging, stamping, 3D printing, or otherwise forming a strikeface 12. The laser shock surface patterning (LSSP) process requires that the treated portion of the front surface be flat or level. Therefore, step 100 can further comprise grinding, polishing, lapping, or otherwise forming at least one flat region on the front surface 16. For some golf club heads, the entire strikeface front surface 16 is ground, polished, lapped, or otherwise formed to be flat or level. The LSSP process is more efficient on flatter surfaces.

In step 152, a mask layer 140 is placed over the strikeface front surface 16. In some embodiments, the mask layer 140 can be a mesh, such as a metal mesh or wire cloth. The mask layer 140 can also be called a protective mold layer or mesh layer. The mask layer 140 can comprise apertures that correspond to the desired footprint shape of the indentions 100 that are created by the laser shock forging (LSSP) process. The mask layer 140 can be rated by the number of apertures per linear inch. The mask 140 can be a 400 mesh, with 400 equally-spaced apertures per inch. In other embodiments, the mask 140 can be a 200 mesh, 225 mesh, 250 mesh, 275 mesh, 300 mesh, 325 mesh, 350 mesh, 375 mesh, 400 mesh, 425 mesh, 450 mesh, 475 mesh, 500 mesh, 525 mesh, 550 mesh, 575 mesh, 600 mesh, 625 mesh, 650 mesh, 675 mesh, or 700 mesh. In some embodiments, several separate mask layers are used to form different indention patterns on different portions of the strikeface 12.

In step 154, an absorptive layer 142 is applied over the mask layer 140. The absorptive layer 142 can also be called a plasma generation layer or an ablative layer. The material that forms the absorptive layer 142 must be carbon-based, black or very dark in color. In some embodiments, the absorptive layer material is graphite, graphene, or any other suitable carbon-based material. In some embodiments, the absorptive layer 142 can be a tape. The absorptive layer 142 can be taped, sprayed, painted, poured, laid, or otherwise applied to the mask layer 140. In some embodiments with a tape-type absorptive layer 142, the tape can be used to secure the mask layer 140 in place. The absorptive layer 142 absorbs energy from the laser beam 146, causing the material of the absorptive layer 142 to turn into a plasma state. The color of the carbon-based material causes the material to absorb the energy transferred by the laser beam 146 applied in step 156.

In embodiments that use graphene as the absorptive layer 142 material, the uniform geometry of the graphene platelets can absorb the laser energy more efficiently than other carbon materials. Due to its structure, graphene can have a greater surface area that is exposed to the laser beam 156, compared to other carbon materials. In some embodiments, the absorptive material is a spray (or sticky paint), but in other embodiments the material is a powder. The absorptive layer 142 material can be provided as particles of various sizes. The size of the absorptive layer particles can affect the power of the resulting shockwave. For example, larger particles can generate more plasma, resulting is a higher power shockwave, while smaller particles result in a lower power shockwave. The absorptive layer 142 can further comprise air or other trace elements that are trapped within the main material of the layer.

In step 154, a confinement layer 144 is placed over the absorptive layer 142. The confinement layer 144 is formed from a transparent and airtight material. In some embodiments, the confinement layer 144 is water. In other embodiments, the confinement layer 144 is a sheet of glass. The sheet of glass must be flat to ensure an airtight seal against the absorptive material 142. When the confinement layer 144 is water, the absorptive material 142 can be a spray, tape, or sticky paint that will not be washed away (a powder would be susceptible to being washed away). When the confinement layer 144 is a glass sheet, the confinement layer 144 is preferably a powder.

In step 156, a laser beam 146 is concentrated over a spot on the strikeface front surface 16. The energy from the laser beam 146 is transferred through the transparent confinement layer 144 (in this example water) and into the absorptive layer 142. When the laser 146 strikes the absorptive layer 142, the absorptive layer is ablated and then ionized. The laser shock converts the absorptive layer 142 into a plasma state. This creates a shock wave 148 that impacts the surfaces underneath it. The shockwave 148 exhibits a rapid change in pressure, temperature and density of the absorptive layer 142. The mask layer 140 prevents the plasma from affecting the mesh-covered portions of the strikeface front surface 16. However, the apertures in the mask layer 140 allow the plasma shock wave 148 to reach miniature surface portions that are exposed through the apertures. The shock wave 148 forges these exposed miniature surface portions into indentions 100. A single pulse of the laser 146 can forge multiple indentions 100 through the plasma generation caused by the shockwave 148.

The size of the laser beam 146 does not determine the size of the indentions 100. Instead, the mask layer 140 determines the size of the indentions 100. The indentions 100 correspond to the size of the apertures in the mask layer 140. Using the mask layer 140 allows the indention size to be tailored to the desired size to create the desired texture or roughness on the strikeface front surface 16. The texture of the front surface 16 in turn determines the coefficient of the strikeface 12.

As described above, the intensity of the laser beam 146 can affect the coefficient of friction. In some embodiments, an increase in the intensity of the laser beam 146 can increase the friction coefficient. However, in some embodiments, the friction coefficient can also be initially lowered compared to an untreated strikeface. The intensity of the laser beam 146 can also affect the hardness of the strikeface. In some embodiments and for some strikeface materials, the hardness of the strikeface 12 can increase with higher laser beam intensity.

The process of laser shocking treating (LSSP) the surface can be repeated until the laser shock treatment has been applied to any areas of the strikeface 12 where texturing is desired. In some embodiments, the entire striking surface 16 is textured. In some embodiments, only a portion of the strikeface front surface 16 is textured. The repeating of the process is necessary because the size of the laser beam 146 is small in comparison to the strikeface 12. In some embodiments of the method, step 156 of laser shocking a small surface region can be repeated between 300 to 400 times to texture the entire strikeface front surface 16.

Each laser shock 148, covering roughly a 3×3 mm grid (covering an area of 0.09 cm$^2$), can be completed in between 3 and 25 nanoseconds. When further accounting for the time needed to apply the confinement layer 144, the absorptive layer 142, and the mask layer 140, each indention 100 can be created in between 0.4 microseconds and 0.8 microseconds. In some embodiments, each indention can be created in 0.6 microseconds. The high speed of the forging of the indentions 100, compared to slower methods lacking the mask layer 140, allows the strikeface 12 to be manufactured quickly.

In some embodiments, the surface being treated is a curved surface. The laser shock surface patterning (LSSP) process requires a level surface across at least a local treatment region. Thus, a curved surface can be treated by dividing it into a plurality of locally flat surface regions. These flat regions enable local application of a plurality of indentions through the laser shock surface patterning process.

In step 158 the confinement layer 144 and the mask layer 140 are removed from on top of the strikeface 12. In some embodiments, this requires draining water off from on top of the absorptive layer 142. The treated surface can be cleaned after the laser shock treatment (LSSP) is complete. Any residue left from the obliteration of the absorptive layer 142 can be wiped off or otherwise removed from the strikeface 12.

The above-describe method can be called an indirect laser shock treatment (or indirect laser shock surface patterning). In some embodiments, a method of producing the golf club head described herein comprises a direct laser shock treatment method. In a direct laser shock treatment method, the mask layer 140 is placed on top of the absorptive layer 142, shielding the absorptive layer 142 from the laser beam 146. In alternate embodiments of the method of forming the strikeface disclosed herein, the laser shock treatment (LSSP) can be applied to a sheet metal piece before the strikeface 12 is cut out of the sheet metal piece.

A method of manufacturing a strikeface rear surface, a sole surface, and/or a crown surface comprise steps similar to the steps for treating the strikeface front surface 16. The manufacturing method for producing a golf club head with one or more treated surfaces can comprise: providing a golf club head body and providing a strikeface, placing a mask layer on the surface to be treated, applying an absorptive layer over the mask layer, placing a confinement layer over the absorptive layer, concentrating a laser beam over a spot on the surface to be treated to forge an indention array or a portion of an indention array by laser shocking the absorptive layer, aiming the laser at an untreated spot of the surface and repeating the laser shocking process until the desired portion of the surface is treated, removing the confinement layer and the mold layer, and cleaning the surface, if necessary. This method can be applied to a strikeface rear surface, a sole surface, and/or a crown surface. In some embodiments, one or more of the strikeface front surface, the strikeface rear surface, the sole surface, and/or the crown surface are treated according to this manufacturing method more than once. Treating a surface more than once can alter the shape of the indentions, increase the hardness of the surface, and/or alter the depth of the indentions.

Production Apparatus

Manufacturing the strikeface 12 having the herein described texture can require a production apparatus. Typically, the production apparatus includes a means of securing a strikeface 12, a crown insert, a sole insert, and/or a golf club head body comprising a crown and sole. The production apparatus further includes a casing that secures and/or bounds the mask layer 140, the absorptive layer 142, and the confinement layer 144.

In some manufacturing scenarios, sourcing a mask layer (or mesh) that is the size of the strikeface can be costly for producing indentions with a width of 1.2 μm or less. Therefore, to cut down production costs, small meshes, commonly known as TEM grids, can be used in place of a strikeface-sized mask layer. TEM grids are readily available on the market and affordable because they are commonly used in transmission electron microscopy.

Figure 12:
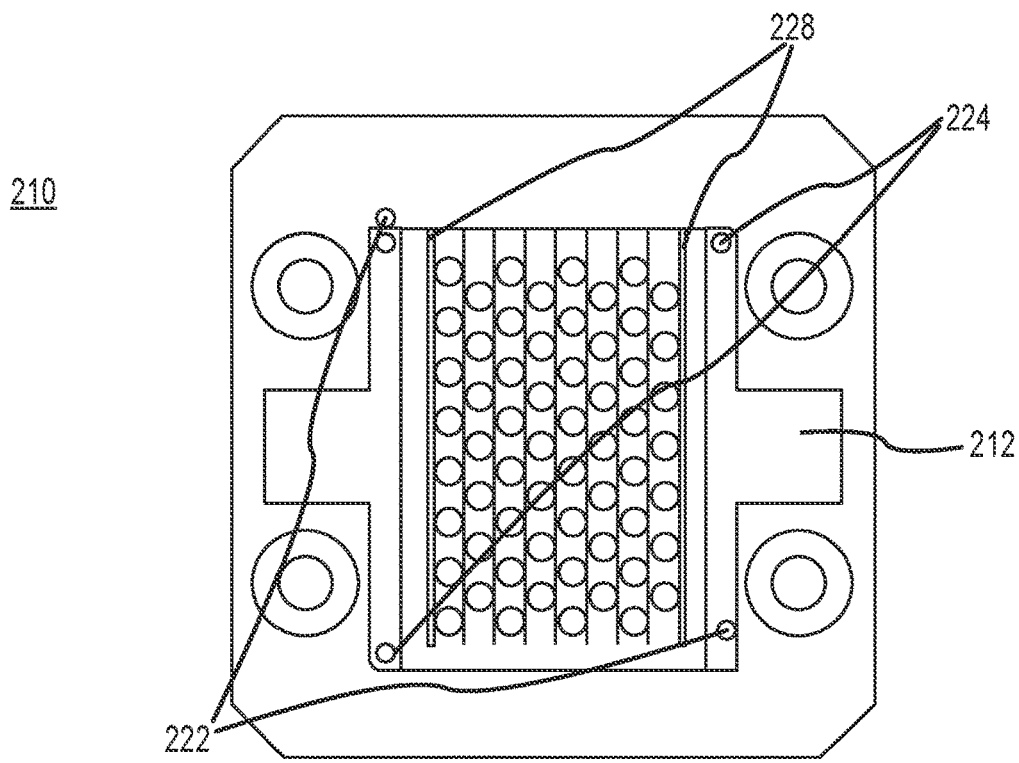
FIG. 12 shows a top view of the production apparatus of FIG. 10, without the frame.
Figure 13:
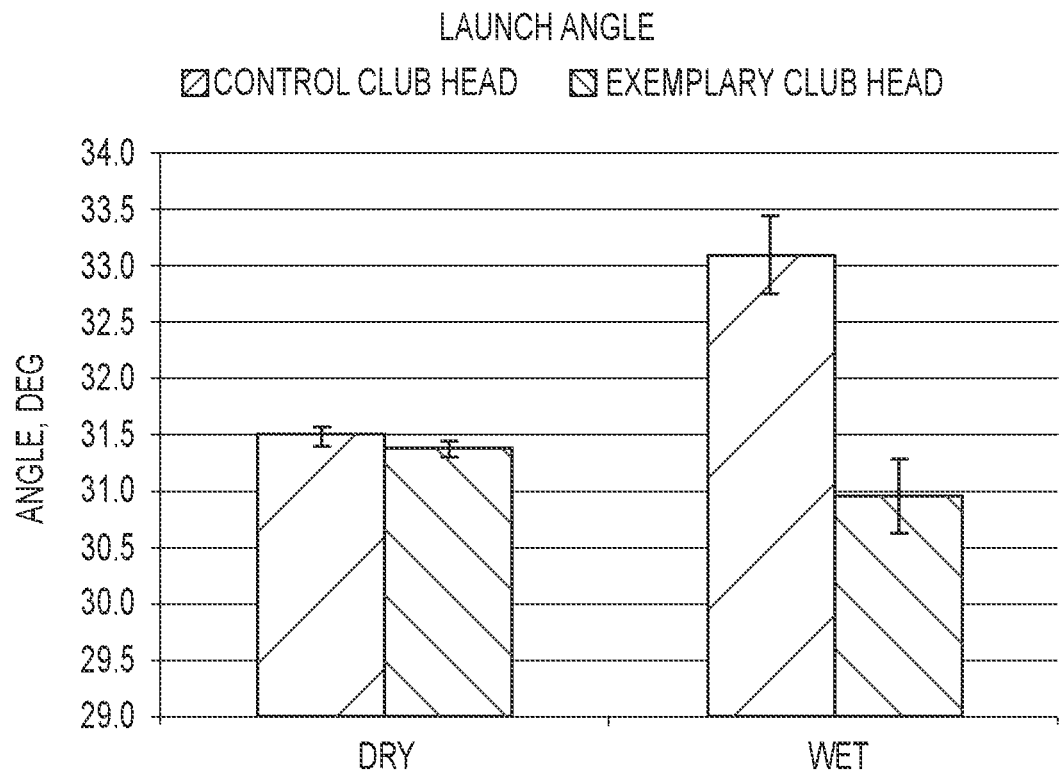
FIG. 13 shows a graph of launch angle for a control club head and an exemplary club head, under wet and dry conditions, according to a test.

In some embodiments, the production apparatus can comprise a foundation plate that holds the club head, a frame, and a plurality of pins (not shown) to releasably secure the frame to the foundation plate. The frame can slide when the plurality of pins is not in place. FIGS. 12 and 13 illustrate a production apparatus 200 lacking a means of holding a club head, but operates in the same manner as a production apparatus with a means of holding a club head. The frame 230 sits on top of the foundation plate 210. The frame 230 houses the TEM grids. The frame 230 is secured in either a first position or a second position relative to the foundation plate 210. FIG. 13 shows the frame 230 in the second position. In the first position, the frame 230 can be located slightly above where it would be in the second position. Since the frame 230 determines where the laser shock surface treatment is given, the position of the frame 230 controls what areas of the strikeface are treated.

Figure 14:
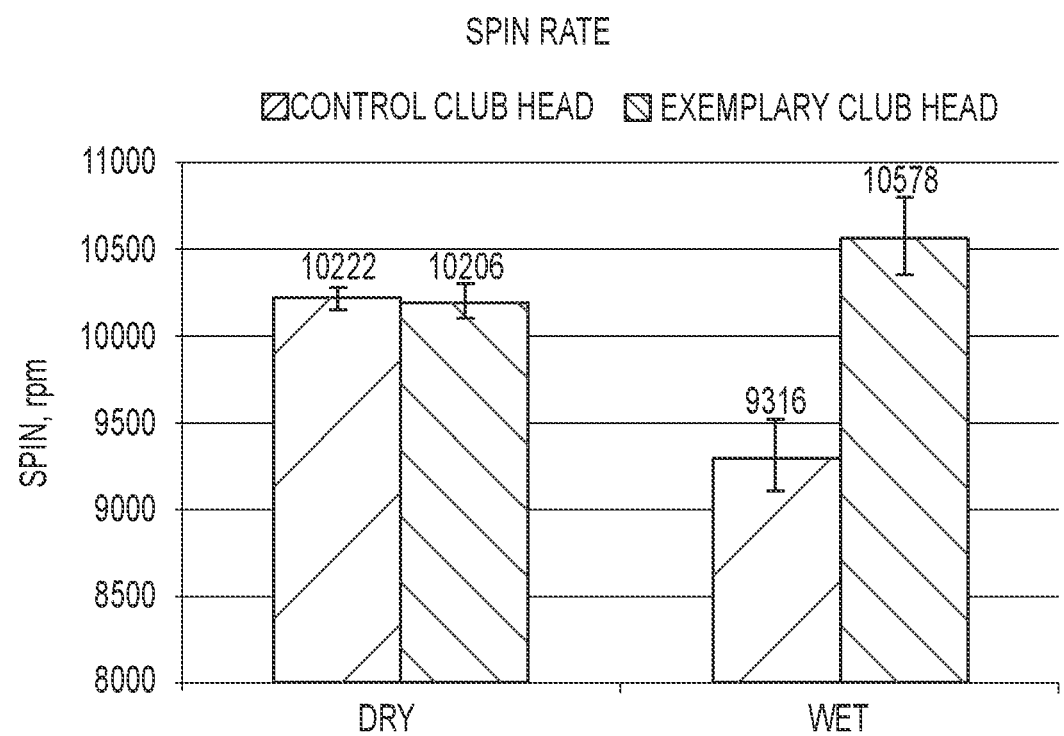
FIG. 14 shows a graph of spin rate for a control club head and an exemplary club head, according to a test done under both wet and dry conditions.

Referring to FIGS. 13 and 14, the foundation plate 210 comprises a top surface 212, a bottom surface (not shown), a means of clamping a golf club head (not shown), a plurality of bores for receiving fastening members 218, and a plurality of pin holes 222, 228 for receiving pins. In some embodiments, a cavity (not shown) is formed in the top surface 212. The cavity is shaped to hold a golf club head with the strikeface facing upwards. The strikeface can be positioned parallel to the top surface 212.

The foundation plate 210 itself can be secured to a laser table via the plurality of bores 218 and fastening members (not shown). In some embodiments, clamps or other fastening mechanisms are used to hold the golf club head in the cavity. In some embodiments, the top surface 212 of the foundation plate 210 comprises two tracks 228 which engage the frame 230, allowing it to slide from the first position to the second position. In other embodiments, the foundation plate top surface 212 lacks the tracks 228. In these embodiments, the frame 230 can be lifted and moved from the first position to the second position.

The frame 230 comprises a top surface 232 and a bottom surface (not shown). Typically, the frame 230 is formed from a thick sheet of metal. The frame 230 comprises a plurality of apertures 238, sized to receive the TEM grids. The plurality of apertures 238 is arrayed across the frame 230. Each aperture extends through the frame 230 from the top surface 232 to the bottom surface. Each aperture can comprise a diameter. The apertures 238 can be spaced apart by a distance less than the diameter of an aperture. The plurality of apertures 238 can comprise between 40 to 80 apertures. In some embodiments, the plurality of apertures 238 comprises 40, 45, 50, 55, 60, 65, 70, 75, or 80 apertures.

The frame 230 further comprises clamp tabs 236. The clamp tabs 236 extend out from two or more sides of the frame 230. The clamp tabs 236 allow the frame 230 to be secured to the work table and/or the foundation plate 210. Securing the frame 230 is important for maintaining a watertight seal between the foundation plate 210 and the frame 230. The watertight seal is necessary because deionized water is often used as the confinement layer.

The frame 230 further comprises a plurality of pin holes 240 for receiving pins. With the frame 230 in the first position, at least one of the foundation plate pin holes 222, 224 corresponds to at least one of the frame pin holes 240. When the frame 230 is placed in the second position, different foundation plate pin holes 222, 224 correspond to different frame pin holes 240. In this way, a first set of pin holes 222 are only used when the frame is in the first position, and a second set of pin holes 224 are only used in the second position. This allows an operator to easily identify what position the frame is in. At least one pin is placed through at least one pin hole to properly align and hold the frame 230 in either the first or second position.

One example method using the production apparatus 200 can comprise first bolting the foundation plate 210 onto a laser table. The golf club head is secured to the foundation plate 210. The frame 230 is aligned over the foundation plate 210 and the club head strikeface. The frame 230 is aligned in a first position with the foundation plate 210. The frame 230 is clamped down onto the foundation plate 210 and the strikeface. A plurality of TEM grids (acting as the mask layer) are inserted into the plurality of apertures 238 of the frame 230. A carbon powder or graphene powder (acting as an absorptive layer) is tamped into the plurality of apertures 238 to cover the TEM grids. The plurality of apertures 238 is further filled with a deionized water (acting as a confinement layer). A Nd-YAG laser is shot through each aperture of the plurality of apertures 238 to peen (or forge) the portions of the strikeface underneath each aperture.

The frame 230 is removed and cleaned. The frame 230 is placed onto the foundation plate 210 in the second position. The process of preparing and treating the face is repeated at the second location. Because the frame 230 has been shifted, new areas of the face are treated. In this way, a majority of the strikeface surface area can be treated in a time-efficient and cost-effective manner.

EXAMPLES

Example 1—Robot Test

A comparison was done between an exemplary golf club head having a textured strikeface front surface and a control golf club head having a strikeface front surface lacking said texture. The exemplary golf club head was a wedge-type golf club head, having a loft angle of 58 degrees. The exemplary golf club head comprised a strikeface and a body, similar to golf club head 10, describe above. The exemplary golf club head was formed from 8620 alloy steel. The strikeface comprised a front surface having a plurality of indentions.

In the exemplary club head, the indentions on the strikeface front surface were square-shaped. Each indention of the plurality of indentions had a footprint area of approximately 1369 μm$^2$ (0.00000225 in$^2$), a width of approximately 37 μm (0.0015 inch), a height of approximately 37 μm (0.0015 inch), and a maximum depth of approximately 600 μm (0.0232 inch). The plurality of indentions was organized into rows of indentions. The rows were oriented horizontally (heel-to-toe) when the golf club head was at address position. Each indention was spaced apart from each adjacent indention by a separation distance of approximately 37 μm (0.0015 inch). The plurality of indentions was formed into the strikeface of the exemplary golf club head using a LSSP process. The control golf club head was identical to the exemplary golf club head, except the control lacked a plurality of indentions on the strikeface front surface.

The plurality of indentions was applied in groups, where each group of indentions was organized in a circle with a 2 mm diameter (similar to the pocket regions 62, described above). Each group of indentions was made with a single laser pulse, which had a duration of 7 ns, and an energy density of 1 GW/cm^2. The groups of indentions were placed adjacent to one another, with approximately 0.1 mm distance between the edge of each 2 mm diameter circle in the heel-to-toe direction. Overlapping groups of indentions is not possible. Therefore, achieving a minimum separation distance between groups is critical to covering the surface with the LSSP texture/indentions.

Three performance parameters were tested: launch angle, ball speed, and ball spin. Each parameter was tested under both dry and wet conditions. In the wet condition test, both the ball and the club head were exposed to moisture prior to each test shot. The comparison was done using a robot, which was programmed to swing the golf club in an identical manner for each shot. Fifteen shots were taken under dry conditions and fifteen shots were taken under wet conditions. The data is presented below as averages of these fifteen shot sets. A statistical area corresponding to where the shots settled was also measured for both clubs, to illustrate each test club's potential shot precision.

Figure 15:
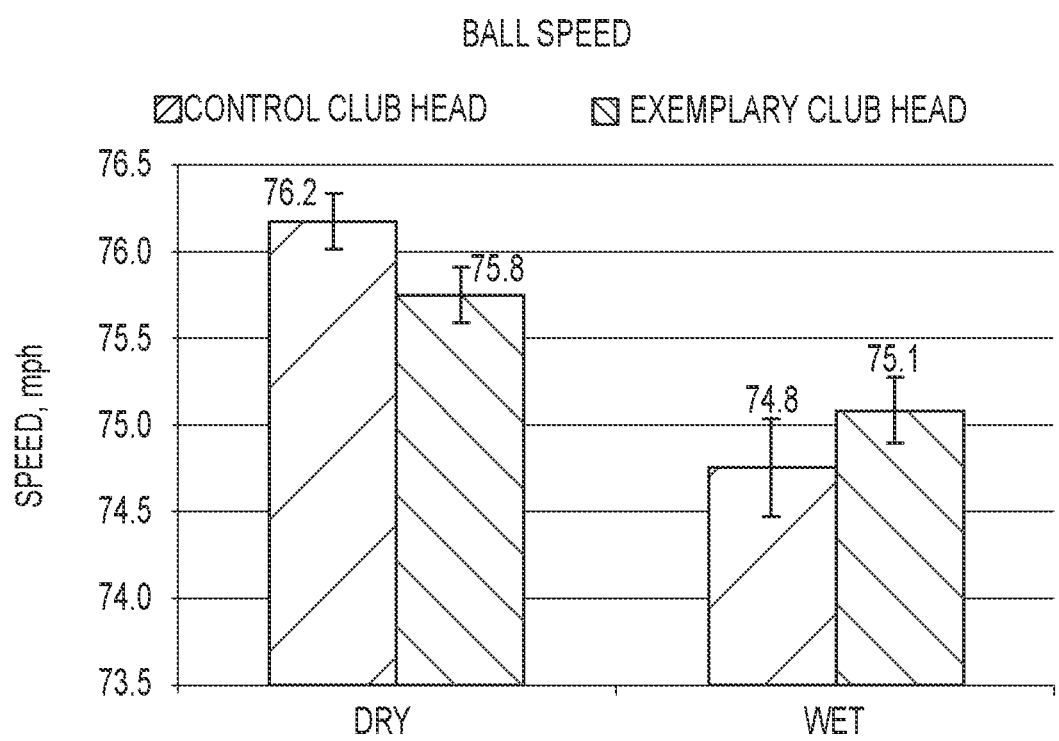
FIG. 15 shows a graph of ball speed for a control club head and an exemplary club head, according to a test done under both wet and dry conditions.

As illustrated in the graph of FIG. 15, under dry conditions, the launch angle of the exemplary club head was roughly comparable to the launch angle of the control club head. In this test, the launch angle was approximately 31.5 degrees for the control and approximately 31.4 degrees for the exemplary club head, with error bars of roughly 0.2 degrees. However, under wet conditions, the launch angle of the exemplary club head was approximately 2.2 degrees less than the launch angle of the control club head, with error bars of approximately 0.7 degrees. The launch angle was approximately 33.1 degrees for the control and approximately 30.9 for the exemplary club head. The lower launch angle of the exemplary club head can cause the ball to travel a more precise distance. Since wind intensity increases at higher distances above the ground, when the launch angle is lower, the golf ball will spend less time in elevated wind conditions. As seen in the aforementioned data, the exemplary club head exhibited a wet condition launch angle close to its dry condition launch angle. This performance similarity across conditions creates more consistency for the golfer, allowing him or her to better predict shot performance.

Figure 16:
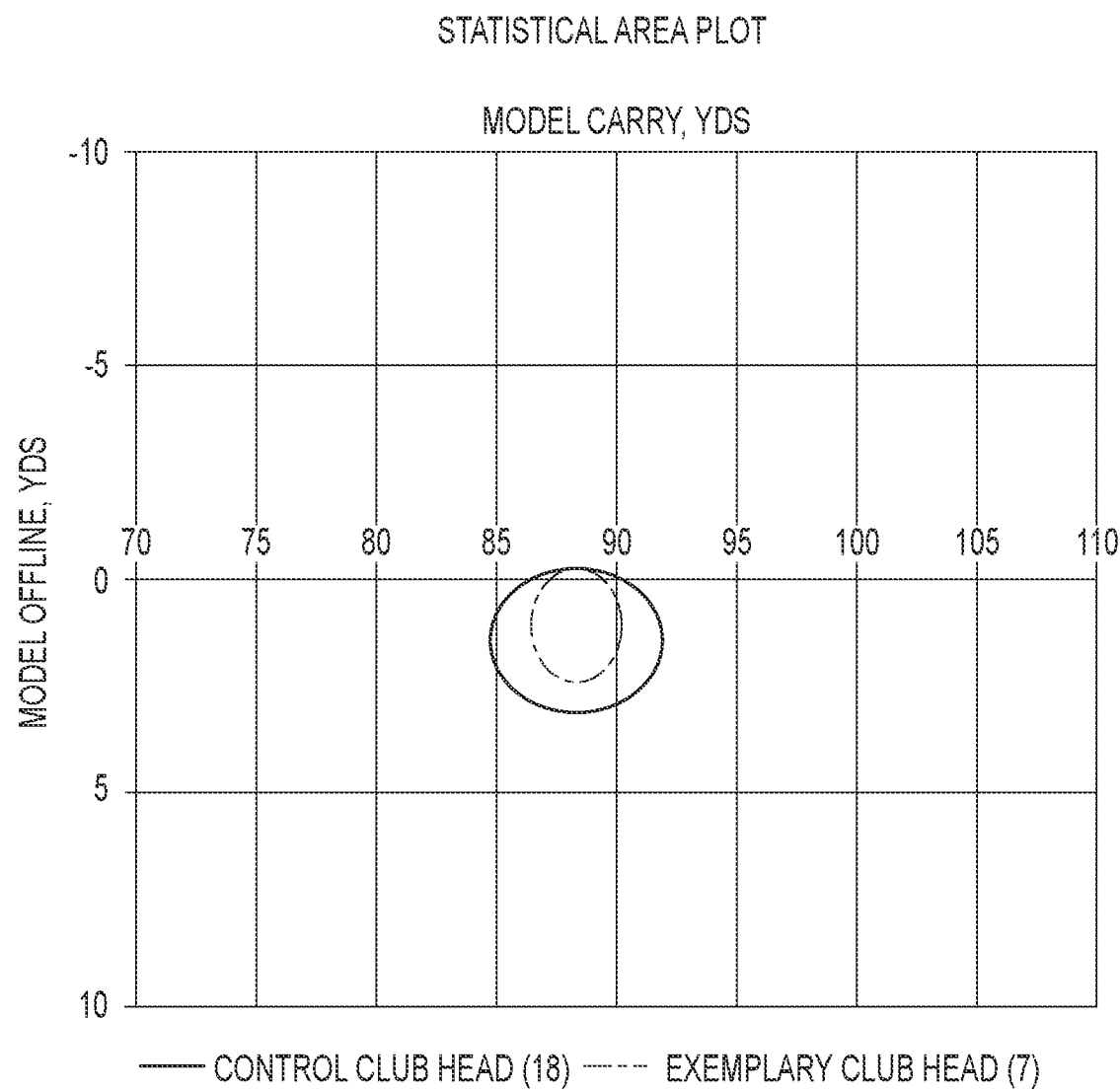
FIG. 16 shows a graph of statistical area for a control club head and an exemplary club head, according to a test done under both wet and dry conditions.

As illustrated in the graph of FIG. 16, under dry conditions, the spin rate imparted to a golf ball by the exemplary club head was comparable to the spin rate imparted by the control club head. In this test, the average spin rates under dry conditions were approximately 10,222 rpm for the control and 10,206 rpm for the exemplary club head, with error bars between 100 to 300 rpm. Under wet conditions, the spin rate imparted by the exemplary club head was significantly higher than the spin rate imparted by the control club head. Under wet conditions, the exemplary club head imparted an average spin rate of approximately 10,578 rpm, with an error bar of approximately 500 rpm. Under wet conditions, the control club head imparted an average spin rate of approximately 9,316 rpm. Therefore, under wet conditions, the exemplary club head imparted a spin rate that was approximately 13.5% faster than the spin rate imparted by the control club head. This faster spin rate helps the golf ball to settle close to where the shot first impacts the ground. Reducing the spin rate can reduce rolling of the ball after it lands, which improves shot accuracy.

The spin rate data also shows that the exemplary club head has a more consistent spin rate across dry and wet conditions than the control club head. For the control club head, the average spin differs by approximately 906 rpm between dry and wet conditions. For the exemplary club head, the average spin rate differs by approximately 372 rpm between dry and wet conditions. Therefore, since the average spin rate differs less between dry and wet conditions for the exemplary club head, a golfer will better be able to predict shot performance with the exemplary club head.

As illustrated in the graph of FIG. 17, the ball speed imparted by the exemplary club head was slightly lower under dry conditions and slightly higher under wet conditions, compared to the control club head. Therefore, the ball speed was more consistent across conditions. Under dry conditions, the ball speed imparted by the control club head was approximately 76.2 mph, with an error bar of approximately 0.3 mph. The ball speed imparted by the exemplary club head, under dry conditions, was approximately 75.8 mph, with an error bar of approximately 0.3 mph. Under wet conditions, the ball speed of the exemplary club head was approximately 75.1 mph, with an error bar of approximately 0.4 mph. The ball speed of the control club head was approximately 74.8 mph, with an error bar of approximately 0.6 mph. This data shows that the texture on the strikeface of the exemplary club head does not greatly affect ball speed either negatively or positively, when the overall performance of the club head is considered.

The plot of FIG. 18 shows a statistical area determined by the location at which the test shots landed. Shots taken with the exemplary club head were about more than twice as precise as shots taken with the control club head. The statistical area for the control club head was approximately 18 square yards, whereas the statistical area for the exemplary club head was approximately 7 square yards. Shots taken with the control club head carried from approximately 85 yards to 92 yards, a variance of approximately 7 yards downline. Shots taken with the exemplary club head carried from approximately 87 yards to 90 yards, a variance of approximately 3 yards downline. Additionally, the exemplary club head also exhibited less offline (left or right) variance than the control club head.

This comparison test further showed that the coefficient of friction between the strikeface front surface and a urethane golf ball increased by approximately 40-45%, under wet conditions, when the strikeface was textured by an LSSP process. In other words, the exemplary club head strikeface showed a coefficient of friction that was 40-45% higher than the coefficient of friction of the control club head strikeface.

In summary, the exemplary club head exhibited a lower launch angle, a higher spin rate, and a greater golf ball-to-strikeface coefficient of friction than the control club head. These factors give a golfer greater precision in his or her shots. The test further verified this increase in shot precision through statistical area plots.

Example 2—Prospective Player Test

A prospective player test comparison will be done between an exemplary golf club head having a textured strikeface front surface and a control golf club head having a strikeface front surface lacking said texture. For this comparison test, fifteen to twenty golfers will take shots with the test golf clubs. The exemplary golf club head will be a wedge-type golf club head identical to the exemplary golf club head of Example 1, above. In short, the exemplary golf club head will comprise a strikeface front surface having a plurality of square-shaped indentions, each with a footprint area of approximately 1369 $\mu m^2$ (0.00000225 $in^2$) and a maximum depth of approximately 600 $\mu m$ (0.0232 inch). The plurality of indentions will be formed through an LSSP process. The control golf club head will be identical to the exemplary golf club head, except the control will lack a plurality of indentions on the strikeface front surface.

Three performance parameters will be tested: launch angle, ball speed, and ball spin. Each parameter will be tested under real-world, wet conditions. The shots will be taken from grass turf that is maintained to match fairway conditions on a golf course. Each golfer will take a total of ten shots with each golf club, alternating every five shots between the golf club with the exemplary head and the golf club with the control head. A statistical area corresponding to where the shots settle will also be measured for both clubs, to illustrate each test club's potential shot precision. A coefficient of friction between the strikefaces and a urethane golf ball will be calculated from the launch angle and ball spin results.

It is expected that the launch angle of the exemplary club head will be approximately 2 degrees less than the launch angle of the control club head. The lower launch angle of the exemplary club head is expected to cause the ball to travel a more precise distance.

It is expected that the spin rate imparted by the exemplary club head will be significantly higher than the spin rate imparted by the control club head. The exemplary club head is expected to impart an average spin rate that is approximately 1,000 rpm higher than the control club head. The exemplary club head is expected to impart a spin rate that is approximately 10-20% faster than the spin rate imparted by the control club head. This faster spin rate will help the golf ball to settle close to where the shot first impacts the ground, improving shot accuracy.

It is expected that the ball speed will be between 70 and 80 mph. The ball speed imparted by the exemplary club head, is expected to be approximately 0.5 mph higher than the ball speed imparted by the control club head. A statistical area will be determined by the location at which the test shots land. Shots taken with the exemplary club head are expected to be more than twice as precise as shots taken with the control club head. Additionally, the exemplary club head is expected to exhibit less offline (left or right) variance than the control club head.

Furthermore, the exemplary club head strikeface is expected to show a coefficient of friction (with respect to a urethan covered golf ball) that is 40-45% higher than the coefficient of friction of the control club head strikeface. In summary, the exemplary club head is expected to exhibit a lower launch angle, a higher spin rate, and a greater golf ball-to-strikeface coefficient of friction than the control club head. This test is further expected to verify that texturing the strikeface using LSSP increases shot precision.

Example 3—Laser Intensity to Indention Depth

A prospective experiment will be done to show the correlation between laser intensity and indention depth. Table I, below, shows some expected maximum indention depths of the certain laser intensities.

TABLE I

| | Laser Intensity (GW/cm$^2$) | | | | | |
|---|---|---|---|---|---|---|
| | 0.484 | 0.554 | 0.778 | 0.890 | 575 | 1920 |
| Maximum Indention Depth ($\mu m$) | 0.2 | 0.5 | 0.8 | 0.9 | 4.9 | 15 |

It is expected that treating a strikeface with an LSSP process that uses a laser intensity of approximately 0.484 GW/cm$^2$ will result in a maximum indention depth of approximately 0.2 $\mu m$. It is expected that treating a strikeface with an LSSP process that uses a laser intensity of approximately 0.554 GW/cm$^2$ will result in a maximum indention depth of approximately 0.5 $\mu m$. It is expected that treating a strikeface with an LSSP process that uses a laser intensity of approximately 0.778 GW/cm$^2$ will result in a maximum indention depth of approximately 0.8 $\mu m$. It is expected that treating a strikeface with an LSSP process that uses a laser intensity of approximately 0.890 GW/cm$^2$ will result in a maximum indention depth of approximately 0.9 $\mu m$. It is expected that treating a strikeface with an LSSP process that uses a laser intensity of approximately 575 GW/cm$^2$ will result in a maximum indention depth of approximately 4.9 $\mu m$. It is expected that treating a strikeface with an LSSP process that uses a laser intensity of approximately 1920 GW/cm$^2$ will result in a maximum indention depth of approximately 15 $\mu m$. As outlined by these prospective results, this experiment is expected to show that increasing the laser intensity will also increase the maximum indention depth.

The results of this prospective experiment are expected to resemble the results of an experiment recorded in the publication Mao, Bo & Siddaiah, Arpith & Menezes, Pradeep & Liao, Yiliang. (2018). 'Surface Texturing by indirect laser shock surface patterning for manipulated friction coefficient,' *Journal of Materials Processing Tech*. vol. 257 (2018) pp. 227-233). The Mao, et al. publication teaches that a higher laser intensity can result in a greater indention depth. In the Mao et al. experiment, as the laser intensity increases from approximately 0.5 GW/cm$^2$ to approximately 0.9 GW/cm$^2$, the indention depth increases from approximately 0.2 $\mu m$ to approximately 0.9 $\mu m$.

As the rules to golf may change from time to time (e.g., new regulations may be adopted or old rules may be eliminated or modified by golf standard organizations and/or governing bodies), golf equipment related to the methods, apparatus, and/or articles of manufacture described herein may be conforming or non-conforming to the rules of golf at any particular time. Accordingly, golf equipment related to the methods, apparatus, and/or articles of manufacture described herein may be advertised, offered for sale, and/or sold as conforming or non-conforming golf equipment. The methods, apparatus, and/or articles of manufacture described herein are not limited in this regard.

Although a particular order of actions is described above, these actions may be performed in other temporal sequences. For example, two or more actions described above may be performed sequentially, concurrently, or simultaneously. Alternatively, two or more actions may be performed in reversed order. Further, one or more actions described above may not be performed at all. The apparatus, methods, and articles of manufacture described herein are not limited in this regard.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Clauses:

Clause 1: A golf club head comprising: a body comprising a heel end and a toe end; a strikeface comprising a geometric center; wherein: the strikeface comprises a front surface; the front surface comprises a plurality of indentions; each indention of the plurality of indentions comprises a center point, one or more sidewalls, and a bottom surface; each indention has a footprint area measured as the area bounded by the sidewalls within a plane coincident with the front surface; the footprint area is between 0.01 $\mu m^2$ and 250,000 $\mu m^2$; each indention has a maximum depth measured orthogonal to the front surface, from the bottom surface to a plane coincident with the front surface; the maximum depth is between 0.1 $\mu m$ to 15 $\mu m$; each indention has a width measured in a heel-to-toe direction through the center point of the indention; and the width is between 0.1 $\mu m$ and 500 $\mu m$.

Clause 2: The golf club head of clause 1, wherein: each indention has a height measured in a sole-to-top rail direction through the center point of the indention; and the height is between 0.1 $\mu m$ and 500 $\mu m$.

Clause 3. The golf club head of clause 1, wherein a coefficient of friction between the front surface and a urethane covered golf ball is between 0.05 and 0.95.

Clause 4: The golf club head of clause 1, wherein each indention's footprint area has a shape selected from the group consisting of: a square shape, a triangular shape, a rectangular shape, a circular shape, and a hexagonal shape.

Clause 5: The golf club head of clause 1, wherein the one or more sidewalls comprises a number of sidewalls selected from the group consisting of: one sidewall, two sidewalls, three sidewalls, four sidewalls, five sidewalls, six sidewalls, seven sidewalls, eight sidewalls, nine sidewalls, and ten sidewalls.

Clause 6: The golf club head of clause 1, wherein the plurality of indentions covers between 30% to 60% of the front surface.

Clause 7: The golf club head of clause 1, wherein the plurality of indentions covers between 60% to 100% of the front surface.

Clause 8: The golf club head of clause 1, wherein the footprint area is between 500 $\mu m^2$ and 100,000 $\mu m^2$.

Clause 9: The golf club head of clause 1, wherein every indention of the plurality of indentions is spaced apart from adjacent indentions by a separation distance of between 1 $\mu m$ and 250 $\mu m$ (approximately 3.9×10-5 inch and approximately 0.0098 inch).

Clause 10: The golf club head of claim 1, wherein the plurality of indentions increase golf ball spin rate by 5% to 30%, under wet conditions.

Clause 11: The golf club head of claim 1, wherein the plurality of indentions increase launch angle by 1-3 degrees, under wet conditions.

Clause 12: A golf club head comprising: a body comprising a heel end and a toe end; a strikeface comprising a geometric center; wherein: the strikeface comprises a front surface; the front surface comprises an indention array, having multiple indention rows aligned parallel to an array axis; each indention comprises a center point, one or more sidewalls, and a bottom surface; each indention has a footprint area measured as the area bounded by the sidewalls within a plane coincident with the front surface; the footprint area is between 0.01 $\mu m^2$ and 250,000 $\mu m^2$; each indention has a maximum depth measured orthogonal to the front surface, from the bottom surface to a plane coincident with the front surface; the maximum depth is between 0.1 $\mu m$ to 15 $\mu m$; each indention has a width measured parallel to the array axis through the center point of the indention; and the width is between 0.1 $\mu m$ and 500 $\mu m$.

Clause 13: The golf club head of clause 12, wherein: the golf club head further comprises a horizontal reference axis, which extends through the geometric center of the strikeface from the heel end to the toe end; and the indention array is angled such that the array axis intersects the horizontal reference axis at an angle of plus or minus 0 to 90 degrees.

Clause 14: The golf club head of clause 13, wherein: the indention array is angled such that the array axis intersects the horizontal reference axis at an angle selected from the group consisting of: plus or minus 10 degrees, plus or minus 20 degrees, plus or minus 30 degrees, plus or minus 40 degrees, plus or minus 45 degrees, plus or minus 50 degrees, plus or minus 60 degrees, plus or minus 70 degrees, plus or minus 80 degrees, and 90 degrees.

Clause 15: The golf club head of clause 12, wherein: the golf club head further comprises a horizontal reference axis, a low region, and a high region; the horizontal reference axis extends through the geometric center of the strikeface from the heel end to the toe end; the low region is below the horizontal reference axis; the high region is above the horizontal reference axis; and a majority of the indention array is located within the low region.

Clause 16: The golf club head of clause 12, wherein a coefficient of friction between the front surface and a urethane covered golf ball is between 0.05 and 0.95.

Clause 17: The golf club head of clause 12, wherein: the indention array comprises an array length, measured in a direction from the heel end to the toe end; and the array length is between 1.5 inch and 2.5 inches.

Clause 18: A golf club head comprising: a body; a strikeface; wherein: the strikeface comprises a front surface; the front surface comprises an indention array, having multiple indention rows aligned parallel to an array axis; each indention comprises a center point, one or more sidewalls, and a bottom surface; each indention has a footprint area measured as the area bounded by the sidewalls within a plane coincident with the front surface; the footprint area is between 0.01 $\mu m^2$ and 250,000 $\mu m^2$; each indention has a maximum depth measured orthogonal to the front surface, from the bottom surface to a plane coincident with the front surface; each indention has a width measured parallel to the array axis through the center point of the indention; each indention comprises an aspect ratio, which equals the maximum depth over the width; the aspect ratio is between 3 and 150.

Clause 19: The golf club head of clause 18, wherein the aspect ratio is between 75 and 125.

Clause 20: The golf club head of clause 18, wherein the aspect ratio is between 50 and 100.

The invention claimed is:

1. A golf club head comprising:
a body comprising a heel end, a toe end, a top rail, and a sole;
a strikeface comprising a geometric center;
wherein:
the golf club head defines a horizontal reference axis extending through the geometric center of the strikeface from the heel end to the toe end;
the strikeface defines a low region between the horizontal reference axis and the sole;
the low region of the strikeface comprises a textured region including a plurality of pocket regions;
each pocket region of the plurality of pocket regions comprises a plurality of indentions;
each indention of the plurality of indentions comprises a center point, one or more sidewalls, and a bottom surface;
each indention has a maximum depth measured orthogonal to the strikeface, from the bottom surface to a plane coincident with the strikeface;
the maximum depth is between 0.1 µm to 15 µm;
each indention has a width measured in a heel-to-toe direction through the center point of the indention;
the width is between 0.1 µm and 500 µm;
each pocket region is spaced apart from adjacent pocket regions by a pocket region separation distance; and
the plurality of pocket regions do not overlap with each other.

2. The golf club head of claim 1, wherein:
each indention has a height measured in a sole-to-top rail direction through the center point of the indention; and
the height is between 0.1 µm and 500 µm.

3. The golf club head of claim 1, wherein a coefficient of friction between the strikeface and a urethane covered golf ball is between 0.05 and 0.95.

4. The golf club head of claim 1, wherein each indention comprises a footprint area measured as an area bounded by the sidewalls within a plane coincident with the strikeface, the footprint area is between 0.01 µm² and 250,000 µm².

5. The golf club head of claim 4, wherein the footprint area of each indention has a shape selected from a group consisting of: a square shape, a triangular shape, a rectangular shape, a circular shape, and a hexagonal shape.

6. The golf club head of claim 1, wherein the one or more sidewalls comprises a number of sidewalls selected from a group consisting of: one sidewall, two sidewalls, three sidewalls, four sidewalls, five sidewalls, six sidewalls, seven sidewalls, eight sidewalls, nine sidewalls, and ten sidewalls.

7. The golf club head of claim 1, wherein the plurality of indentions are formed by a laser shock surface patterning process.

8. The golf club head of claim 1, wherein each indention of the plurality of indentions is spaced apart from adjacent indentions by an indention separation distance of between 1 µm and 250 µm (approximately $3.9 \times 10^{-5}$ inch and approximately 0.0098 inch).

9. The golf club head of claim 1, wherein each indention comprises an aspect ratio between 3 and 150, wherein the aspect ratio equals maximum depth over the width.

10. The golf club head of claim 1, wherein the plurality of indentions are arranged in an indention array, having multiple indention rows aligned parallel to an array axis.

11. A golf club head comprising:
a body comprising a heel end, a toe end, a top rail, and a sole;
a strikeface comprising a geometric center;
wherein:
the golf club head defines a horizontal reference axis extending through the geometric center of the strikeface from the heel end to the toe end;
the strikeface defines a high region between the top rail and the horizontal reference axis;
the high region of the strikeface comprises a textured region including a plurality of pocket regions;
each pocket region of the plurality of pocket regions comprises a plurality of indentions;
each indention of the plurality of indentions comprises a center point, one or more sidewalls, and a bottom surface;
each indention has a maximum depth measured orthogonal to the strikeface, from the bottom surface to a plane coincident with the strikeface;
the maximum depth is between 0.1 µm to 15 µm;
each indention has a width measured in a heel-to-toe direction through the center point of the indention;
the width is between 0.1 µm and 500 µm;
each pocket region is spaced apart from adjacent pocket regions by a pocket region separation distance; and
the plurality of pocket regions do not overlap with each other.

12. The golf club head of claim 11, wherein:
each indention has a height measured in a sole-to-top rail direction through the center point of the indention; and
the height is between 0.1 µm and 500 µm.

13. The golf club head of claim 11, wherein a coefficient of friction between the strikeface and a urethane covered golf ball is between 0.05 and 0.95.

14. The golf club head of claim 11, wherein each indention comprises a footprint area measured as an area bounded by the sidewalls within a plane coincident with the strikeface, the footprint area is between 0.01 µm² and 250,000 µm².

15. The golf club head of claim 14, wherein the footprint area of each indention has a shape selected from a group consisting of: a square shape, a triangular shape, a rectangular shape, a circular shape, and a hexagonal shape.

16. The golf club head of claim 11, wherein the one or more sidewalls comprises a number of sidewalls selected from a group consisting of: one sidewall, two sidewalls, three sidewalls, four sidewalls, five sidewalls, six sidewalls, seven sidewalls, eight sidewalls, nine sidewalls, and ten sidewalls.

17. The golf club head of claim 11, wherein the plurality of indentions are formed by a laser shock surface patterning process.

18. The golf club head of claim 11, wherein each indention of the plurality of indentions is spaced apart from adjacent indentions by an indention separation distance of between 1 µm and 250 µm (approximately $3.9 \times 10^{-5}$ inch and approximately 0.0098 inch).

19. The golf club head of claim 11, wherein each indention comprises an aspect ratio between 3 and 150, wherein the aspect ratio equals maximum depth over the width.

20. The golf club head of claim 11, wherein the plurality of indentions are arranged in an indention array, having multiple indention rows aligned parallel to an array axis.

* * * * *